US008868133B1

(12) United States Patent  
Rosenbaum et al.

(10) Patent No.: US 8,868,133 B1  
(45) Date of Patent: Oct. 21, 2014

(54) BEACON AND ASSOCIATED COMPONENTS FOR A RANGING SYSTEM

(75) Inventors: Glen Var Rosenbaum, Gilbert, AZ (US); Gordon J. Laughlin, Gilbert, AZ (US); Don Doerrse, Scottsdale, AZ (US)

(73) Assignee: Corvas Technologies Corp, Gilbert, AZ (US)

( * ) Notice: Subject to any disclaimer, the term of this patent is extended or adjusted under 35 U.S.C. 154(b) by 240 days.

(21) Appl. No.: 13/489,298

(22) Filed: Jun. 5, 2012

Related U.S. Application Data

(63) Continuation-in-part of application No. 13/430,525, filed on Mar. 26, 2012, now abandoned, which is a continuation of application No. PCT/US2012/266666, filed on Feb. 24, 2012.

(60) Provisional application No. 61/446,470, filed on Feb. 24, 2011, provisional application No. 61/446,474, filed on Feb. 24, 2011.

(51) Int. Cl.
*H04M 1/00* (2006.01)
*H04W 24/00* (2009.01)

(52) U.S. Cl.
USPC ..................................... 455/562.1; 455/456.1

(58) Field of Classification Search
USPC ............................................ 455/562.1, 456.1
See application file for complete search history.

(56) References Cited

U.S. PATENT DOCUMENTS

| | | | |
|---|---|---|---|
| 7,239,277 | B2 | 7/2007 | Fullerton et al. |
| 7,602,339 | B2 | 10/2009 | Fullerton et al. |
| 8,624,722 | B2 | 1/2014 | Miller et al. |
| 2007/0173265 | A1 | 7/2007 | Gum |
| 2008/0157970 | A1 | 7/2008 | Single et al. |
| 2008/0191941 | A1 | 8/2008 | Saban et al. |
| 2008/0252527 | A1 | 10/2008 | Garcia |
| 2010/0234044 | A1 | 9/2010 | Lohbihler |
| 2011/0037679 | A1 | 2/2011 | Shlager et al. |

OTHER PUBLICATIONS

U.S. Appl. No. 13/492,587, filed Jun. 8, 2012; John C. Lundgreen.

*Primary Examiner* — Joel Ajayi
(74) *Attorney, Agent, or Firm* — Thorpe North & Western LLP

(57) ABSTRACT

A beacon for a ranging system includes an electronic scanned array (ESA) antenna and a transceiver. The ESA antenna is configured to emit a separate radio frequency (RF) phased-array narrow beam for each of a plurality of segments of an arc, and receive from an end user node a response signal based on at least one of the RF phased-array narrow beam. Each segment of the arc is scanned at a specified time interval. The transceiver is configured to transmit a pulsed signal via the RF phased-array narrow beam, and receive the response signal.

11 Claims, 19 Drawing Sheets

BEACON AND ASSOCIATED COMPONENTS FOR A RANGING SYSTEM

RELATED APPLICATIONS

This application is a continuation-in-part of U.S. patent application Ser. No. 13/430,525, filed Mar. 26, 2012 which is a continuation of PCT International Application No. PCT/US12/26666, filed Feb. 24, 2012 which claims the benefit of U.S. Provisional Patent Application Ser. No. 61/446,470, filed Feb. 24, 2011, and U.S. Provisional Patent Application Ser. No. 61/446,474, filed Feb. 24, 2011, each of which is incorporated herein by reference.

FIELD OF THE INVENTION

The present invention relates generally to terrestrial positioning and ranging. Accordingly, the present invention involves the fields of radio frequency based perimeter positioning and ranging and messaging.

BACKGROUND

Satellite navigation systems, such as the global positioning system (GPS) available to military, civil, commercial, and scientific users, enable a receiver to determine a location from ranging signals received from a plurality of satellites. GPS positioning and other location services within buildings can be unreliable or unavailable. Particularly, GPS positioning and other location services may be unreliable or unavailable inside buildings and structures, including large industrial buildings, buildings with rooms, buildings with multiple floors, or outdoors in areas, such as areas with thick undergrowth or other obstructions. Various technologies are used to improve ranging technologies. Some ranging technologies involve establishing a network of positioning stations throughout a structure which can then communicate with a satellite signal. However, such an approach typically requires a pre-existing installation within the building or structure. Furthermore, available technologies have significant limitations in terms of resolution and reliability in a variety of environments.

SUMMARY OF THE INVENTION

A beacon for a terrestrial ranging system includes an electronic scanned array (ESA) antenna and a transceiver. The ESA antenna is configured to emit a separate radio frequency (RF) phased-array narrow beam for each of a plurality of segments of an arc, and receive from an end user node a response signal based on at least one of the RF phased-array narrow beam. Each segment of the arc is scanned at a specified time interval. The response signal can include at least one of a transponder signal, a transceiver signal, or a repeat of either. The beacon is configured to transmit a pulsed signal via the RF phased-array narrow beam, and receive the 'end user node' response signal. The response signal can come from a transceiver or a transponder or a repeater. A transponded signal can be a frequency shifted copy of an original signal transponded from a different location. A repeated signal can be a copy of the original signal repeated from the different location. In an example, the ranging system can include a processing module. The processing module can be configured to calculate at least one of an angle-of arrival (AOA) and a time-of-flight (TOF) from the response signal and generate a location of the end user node relative to a location of the beacon.

In another example, this technology can be used for emitting a radio frequency (RF) phased-array narrow beam using a beacon. One method can include the beacon receiving an RF signal at a splitter and summer module. The splitter and summer module can transmit the RF signal to a plurality of phase shifters. Each phase shifter can correspond to a radiator aperture in an electronic scanned array (ESA) antenna. The phase shifter can phase shift each RF signal to form a narrow in-phase beam in a specified direction. A plurality of radiator apertures can emit the phase shifted signals in a pattern of raster scans. The raster scan can vary between a broad scan and a narrow scan based on programming of corresponding beamformers. The beacon can receive a response signal from an end user node at the plurality of radiator apertures. The response signal can be received through an obstruction.

In another example, this technology can be used for communicating between an end user node and a control station controller used in determining a location of the end user node relative to a beacon. One method can include the controller transmitting an inquiry message to the end user node with a minimum received signal strength indicator (RSSI) message. The minimum RSSI message can include a RSSI threshold for transmitting a reply message from the end user node. The controller can receive a reply message from the end user node including a measured RSSI of the inquiry message at the end user node when the measured RSSI of the inquiry message exceeds the RSSI threshold.

In another example, a control station controller for a ranging system can include a transmitting module and a receiving module. The transmitting module can be configured to transmit an inquiry message to the end user node with minimum received signal strength indicator (RSSI) message. The minimum RSSI message can include a RSSI threshold for transmitting a reply message from the end user node. The receiving module can be configured to receive a reply message from the end user node including a measured RSSI of the inquiry message at the end user node when the measured RSSI of the inquiry message exceeds the RSSI threshold.

In another example, this technology can be used for communicating between an end user node and a control station controller used in determining a location of the end user node relative to a beacon. One method can include the end user node receiving an inquiry message from the controller with minimum received signal strength indicator (RSSI) message. The minimum RSSI message can include a RSSI threshold for transmitting a reply message from the end user node. The end user node can measure a RSSI of the inquiry message. The end user node can transmit a reply message to the controller including the measured RSSI of the inquiry message at the end user node when the measured RSSI of the inquiry message exceeds the RSSI threshold.

In another example, an end user node for a ranging system can include a receiving module, a measurement module, and a transmitting module. The receiving module can be configured to receive an inquiry message from a controller with minimum received signal strength indicator (RSSI) message. The minimum RSSI message can include a RSSI threshold for transmitting a reply message. The measurement module can be configured to measure a RSSI of the inquiry message. The transmitting module configured to transmit a reply message to the controller including the measured RSSI of the inquiry message at the end user node when the measured RSSI of the inquiry message exceeds the RSSI threshold A ranging system includes at least one beacon and a control module. The at least one beacon is configured to scan each segment in a plurality of segments of an arc with a narrow radio frequency (RF) beam and receive a response signal from an end user node in at least one segment. Each segment of the arc is scanned at a specified time interval. The control module is configured to communicate with the at least one beacon. The control module is further configured to calculate at least one of an angle-of-arrival (AOA) and a time-of-flight (TOF) of a response signal from the end user node to the beacon and generate an end user node location relative to a beacon location. In an example, the ranging system can include the end user node configured to receive at least one of the narrow radio frequency (RF) beams and transmit the response signal back to the beacon.

In another example, this technology can be used for determining a location of an end user node relative to the at least one beacon. One method can include at least one beacon scanning each of a plurality of segments in an arc with a separate narrow radio frequency (RF) beam transmitted. The arc is in a direction of the end user node. The at least one beacon can receive a response signal from the end user node based on a received narrow RF beam at the end user node. The technology can determine at least one of an angle-of-arrival (AOA) and a time-of-flight (TOF) of the response signal, and calculate an end user node location relative at least one beacon location using at least one of the AOA and TOF of the response signal.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

Figure 1:
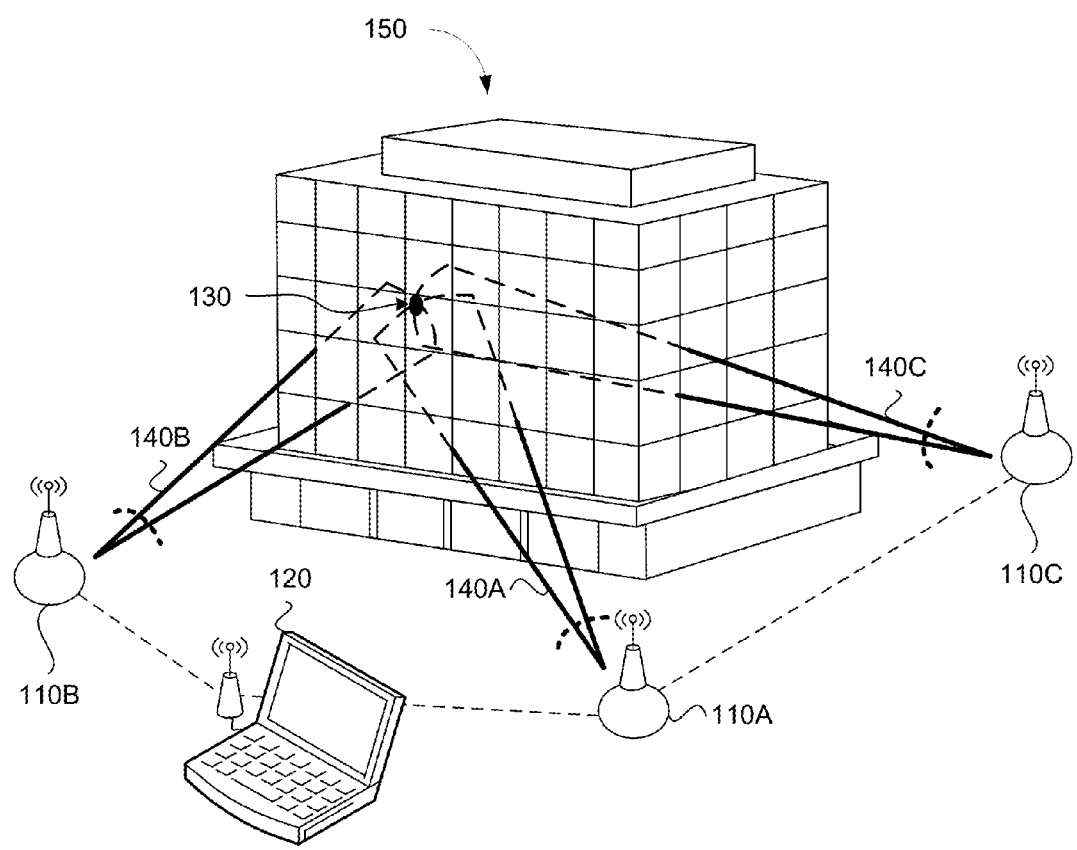
FIG. 1 illustrates a perspective view of a perimeter ranging system with a plurality of beacons in accordance with an example.

These drawings merely depict exemplary embodiments of the disclosure, therefore, the drawings are not to be considered limiting of its scope. It will be readily appreciated that the components of the disclosure, as generally described and illustrated in the figures herein, could be arranged, sized, and designed in a wide variety of different configurations. Nonetheless, the disclosure will be described and explained with additional specificity and detail through the use of the accompanying drawings.

DETAILED DESCRIPTION

It is to be understood that this disclosure is not limited to the particular structures, process steps, or materials disclosed, but is extended to equivalents as would be recognized by those ordinarily skilled in the relevant arts. Alterations and further modifications of the illustrated features, and additional applications of the principles of the examples, which would occur to one skilled in the relevant art and having possession of this disclosure, are to be considered within the scope of the disclosure. It should also be understood that terminology employed herein is used for the purpose of describing particular embodiments only and is not intended to be limiting. The same reference numerals in different drawings represent the same element.

It must be noted that, as used in this specification and the appended claims, the singular forms "a," "an," and "the" include plural referents unless the context clearly dictates otherwise. Thus, for example, reference to "an aperture" includes one or more of such openings, reference to "battery" includes reference to one or more of such devices, and reference to "applying" includes one or more of such steps.

In describing and claiming the present disclosure, the following terminology will be used in accordance with the definitions set forth below.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.6 mm to about 0.3 mm" should be interpreted to include not only the explicitly recited values of about 0.6 mm and about 0.3 mm, but also include individual values and sub-ranges within the indicated range. Thus, included in this numerical range are individual values such as 0.4 mm and 0.5, and sub-ranges such as from 0.5-0.4 mm, from 0.4-0.35, etc. This same principle applies to ranges reciting only one numerical value. Furthermore, such an interpretation should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. Further, unless otherwise stated, the term "about" shall expressly include "exactly," consistent with the discussion above regarding ranges and numerical data.

In the present disclosure, any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the disclosure should be determined solely by the appended claims and their legal equivalents, rather than by the descriptions and examples given herein.

FIG. 1 illustrates an example ranging system (e.g., a terrestrial perimeter ranging system) with a plurality of beacons 110A-C external to a perimeter of a building 150. The ranging system can provide a location, biometric information, and other information of an end user node 130 (e.g., person or object) within a perimeter (e.g., the building) or specified range from the beacons, where global positioning system (GPS) or other location services may be unreliable or unavailable, such as a victim, policeman, soldier, fireman or other asset in a burning building. Location services can be unreliable or unavailable because of obstructions due to construction materials such as concrete and steel in large commercial or industrial buildings, thick undergrowth in an outdoor environment, or where GPS is non-functional. The ranging system can be setup "outside" a perimeter of interest (e.g., a building) using non-intrusive radio frequency (RF) technology. The ranging system can be used in a reactionary "first responder" situation without a priori (e.g., prior knowledge) of a building, structure, or area. In an example, the ranging system can operate using portable, self-powered equipment that is independent of local infrastructure, such as equipment that can be power via battery, generators, solar, or other power source besides commercial grid power. The ranging system can provide current and historical location information of the user node (e.g., end user node, object, or person) without direct monitoring or interaction from an operator.

The ranging system can include various components, such as an end user node 130, beacons 110A-C, and a control station 120. The end user node can include a small, low power transceiver card or device with an omni-directional antenna, which can be placed on each person or object to be tracked. The transceiver card or device can be integrated into a mobile phone, tag, or other portable electronic device. The transceiver card can be a rugged, inexpensive, and mass production oriented device. One to several hundred user nodes can be tracked by the ranging system.

The beacons 110A-C (e.g., perimeter beacons) can provide RF ranging and communications modules outside the target operational environment (e.g., on the perimeter). The beacons can configured to scan 140A-C segments of an arc (e.g., a raster scan pattern) with a narrow radio frequency (RF) beam and receive a response signal from an end user node in at least one segment. Each segment of the arc is scanned at a specified time interval. For example, each segment may represent 2 degrees (2°) in the arc and the arc may represent a section of a circle or sphere to be scanned, such as 120 degrees (using spherical coordinates). Although 2° per segment can be useful, arc segments can functionally range from about 0.2° to about 20°. The raster scan pattern can include increments in two axes, such as horizontal and vertical axes. Additional beacons can provide an expandable network to meet the size of a perimeter-of-interest. One beacon can be capable of a total geographical-location (geo-location) capability. However, two to hundreds of beacons can be used depending on the perimeter size or area to be covered. Additional beacons can improve location accuracy.

The control station 120 can link the beacons together using a local area network (LAN) to generate ranging information. The control station provides command center operation for node tasking and ranging information. In an example, the control station can be essentially a "loaded" laptop with an interface box to the beacons and the internet using an internet protocol (IP). Although, the control station illustration shows a separate antenna from the laptop used to communicate with the beacons in the LAN, the antenna can be integrated in a laptop architecture. The control station can be configured to generate an end user node location relative to a beacon location by communicating with at least one beacon. The control module can be configured to calculate an angle-of-arrival (AOA), a time-of-flight (TOF), or both the AoA and the TOF of a response signal from the end user node via the beacon. In an example, the ranging system can use the ZigBee protocol (i.e., Institute of Electrical and Electronics Engineers [IEEE] 802.15.4 or IEEE 802.15.4-2003 compliant), offset quadrature phase-shift keying (OQPSK) modulation at 2.4 gigahertz (GHz), wireless local area network (WLAN), advanced encryption standard (AES) encryption, or external amplifiers (e.g., high power amps [HPA] and low noise amps [LNA]).

Figure 2:
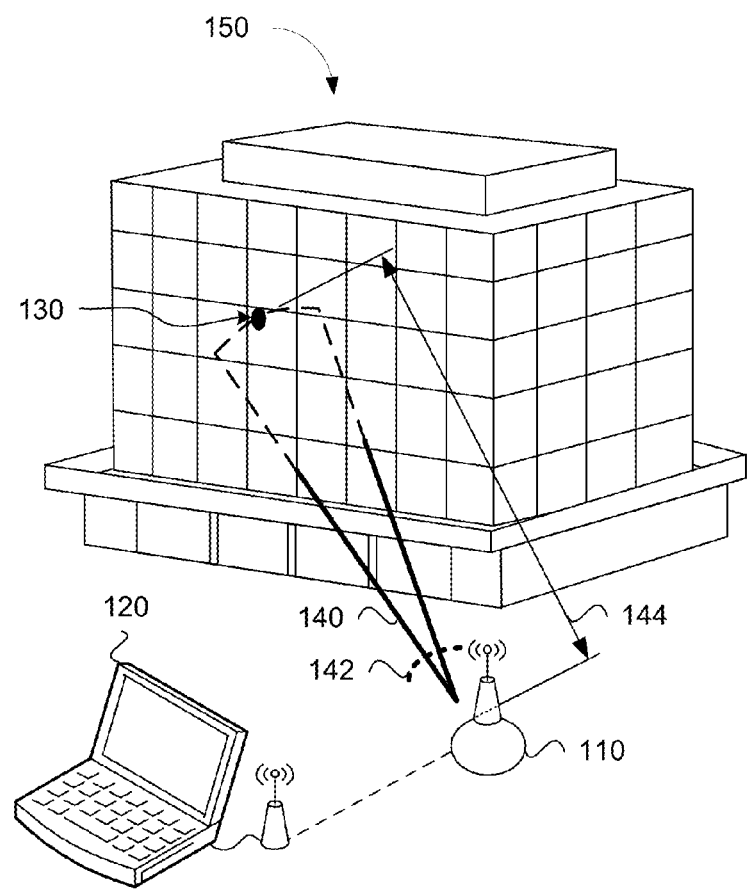
FIG. 2 illustrates a perspective view of a perimeter ranging system with a beacon in accordance with an example.

FIG. 2 illustrates another embodiment of the ranging system using a control station 120 and a single beacon 110. The AoA 142 and the TOF 144 of an emitted narrow radio frequency (RF) beam 140 and/or a received response signal from an end user node 130 can be used to generate the location of the end user node. Thus, the position of the end user node can be determined using a single beacon as described in more detail below.

Figure 3:
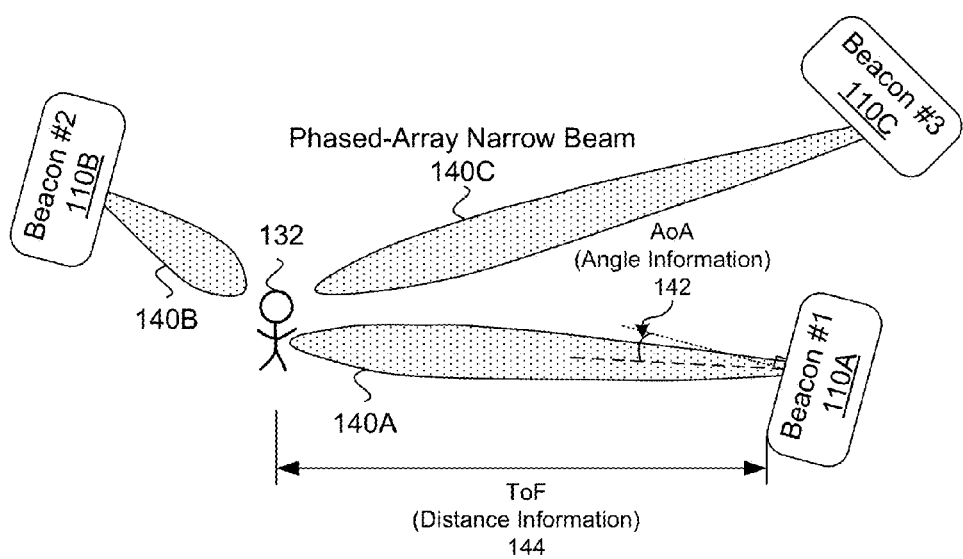
FIG. 3 illustrates a diagram of a ranging system using angle-of-arrival (AOA) and time-of-flight (TOF) information in accordance with an example.

As illustrated in FIG. 3, the ranging system can provide geographical-location (geo-location) capability with a resolution within a meter at a 100 meter distance from transceiver beacons 110 A-C, which can locate the user node (e.g., person 132 or object) inside an area or perimeter, such as a cafeteria, an arena, a hotel, a school, a hardware store, a stadium, a park, a wilderness area, a ship, and a water front. The perimeter ranging system uses narrow RF beams 140A-C generated by an electronic-scanned-array (ESA) antenna or phased-array antenna at the beacon which can scan across and up and down a perimeter of interest, such as a building, using angle-of-arrival angles 142 and/or time of flight (ToF) range distances 144 to triangulate if applicable and determine position. This relates to the angle-of-arrival (AoA) algorithms (described herein) which provides lateral range resolution close to 10% of the ESA beam width; which for example a 5.6 degree beamwidth at 100 meters distance gives 1 meter cross resolution. The geolocation capability also relates to the time-of-flight (ToF) information in collaboration. The rising time constant implementation is described herein, for example, to provide 1 meter distance accuracy as a function of accurate mapping of the charging voltage against time of propagation. Another factor which applies to ToF is the empirical determination and subration of the latency through the end user node. Yet another variable is the step size capability of the analog to digital (A/D) convertor which limits the resolution steps. The composite AoA (angle) and ToF (distance) provide a total three dimensional geolocation solution provided by one beacon. Multiple beacons may also be used in triangulation to provide best solution fits, increasing the area of coverage, accuracy and reliability.

In the angle-of-arrival (AoA) location solution, the array antenna can provide a narrow beam which can electronically scan across the perimeter-of-interest, where the antenna is fixed but different beams are formed from the phase shifting of the signal by the apertures of the ESA antenna. The signal can be similar to radio detection and ranging (RADAR), except that the beam may be not reflected for determining the range. Instead, the narrow beam signal can received by the end user node, and upon interrogation by the beacon, the end user node can return an RF signal to the interrogator (i.e., beacon). The three dimensional angle of the narrow beam emitted and received by the ESA antenna inherently gives directionality. The received signal strength (RSS) of the narrow beam can be measured by the end user and the RSS of the response signal from the end user node can be measured by the control station. The RSS measurement of the narrow beam can be included in the response signal. When the response signal is returned and identified with an end user node and specified AoA, the AoA having the greatest received signal strength indicator (RSSI) strength can be used to determine the angle of the end user node to the beacon. Two or more of these beams can produce angle projections that intersect at the location of the end user node (as shown in FIG. 1), thus providing a total geo-location solution. The narrow beam can also provide a significant bi-directional RF gain (e.g., 20-30 decibel [dB]) for the signal used to penetrate the building or other obstruction. The decibel (dB) is a logarithmic unit that indicates the ratio of a physical quantity (usually power or intensity) relative to a specified or implied reference level. Thus, a ratio in decibels is ten times the logarithm to base 10 of the ratio of two power quantities.

In the time-of-flight (ToF) location solution, each beacon can measure the ToF of the signal from the interrogated end user node to beacon or a round trip signal path from the beacon to the end user node back to the beacon. In another example, the end user node can measure the ToF of the narrow beam from the beacon and return the measurement in the response signal or message. The ToF information can allow the determination of the distance to the end user node. Multiple beacons (e.g., three beacons in FIG. 3) with ToF information can then 'triangulate' and simultaneously solve for the location to derive the end user node's (e.g., person's 132) geo-location. A single beacon having both AoA directionality and ToF distance can be configured to derive an end user node's position (as shown in FIG. 2). Multiple beacons can confirm the location information and provide enhanced reliability and accuracy (as shown in FIG. 1).

Figure 4:
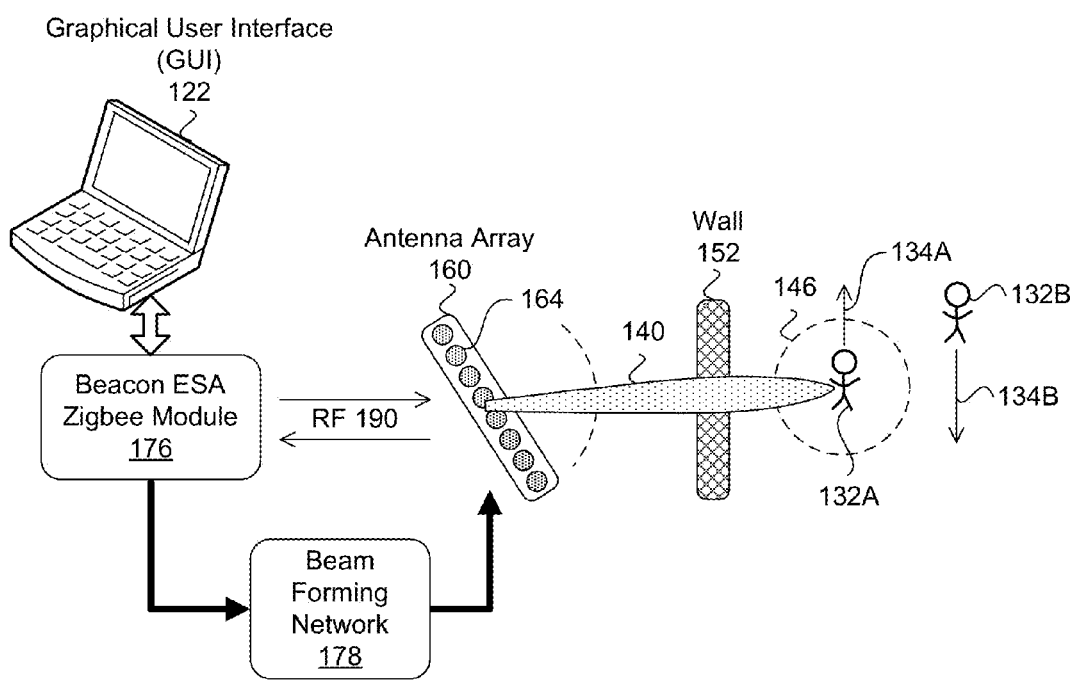
FIG. 4 illustrates a block diagram of a ranging system using a 1×8 antenna array in accordance with an example.

FIG. 4 illustrates a narrow pulsed beam 140 from an antenna array 160 (e.g., an ESA antenna with a plurality of apertures 164) that can penetrate an outside wall 152, which can usually have the most metal, and therefore the most RF shielding (e.g., typically 8 dB loss). Inner walls typically have a minor contribution to attenuation (e.g., <1 dB per wall). However, building walls, ceilings, floors and other materials can attenuate RF signals. The high intensity directional phased-array narrow RF beams or pulses can be capable of penetrating most building construction and foliage obstructions with over a 70 dB link budget margin of penetration (in addition to approximately 51 dB free space loss). Due the reciprocity properties of antennas, the antenna can emit a high intensity directional phased-array narrow RF beam in a specified phase-shifted direction and can receive a weak signal from the omni-directional antenna in a direction of the specified phase-shifted direction. A link budget is an accounting of all of the gains and losses from the transmitter, through the medium (e.g., free space, air, obstruction, cable, waveguide, or fiber) to the receiver in a telecommunication system. The link budget accounts for the attenuation of the transmitted signal due to propagation, as well as the antenna gains, feedline and miscellaneous losses. The enhance RF signal strength of the phased-array antenna (e.g., the ESA antenna) can have an increased intensity by 3 orders of magnitude (×1000 or 30 dB) over an omni-directional antenna. The omni-directional antenna can generate a reduced signal power response in an omni-directional beam 146. In an example, the narrow beams in a raster pattern scan can carry an interrogation message which can received and responded to automatically by the end user node (carried by a person 132A-B or object of interest), inside the perimeter. The information of the person's location, direction of travel 134A-B and/or status can be communicated back thru a secure (encrypted) dedicated network to a control and command center, which initiated the inquiry. In an example, the perimeter ranging system can provide user node ranging for up to 7-8 levels of a typical building structure. In an example, the control station can include a graphical user interface 122 (GUI) for tracking the end user nodes. The beacon can include a beacon ESA ZigBee module for communicating with the control station via the LAN, generating the RF signals 190 for the antenna array, and providing signals for the beam forming network 178.

In an example, the beacons 110 can have at least two antennas, including an ESA antenna 162 and an omni-directional antenna (e.g., a monopole antenna 182 or multiple input multiple output [MIMO]). The ESA beam antenna which can include an array of radiator elements 164 can support the ranging functions. The omni-directional antenna can support the mesh network, attitude information, and communications to the control station. The beacon can include transceivers and a ranging and ESA antenna control electronics module 184 used to generate the narrow beams for scanning and for communication with the control station an antennas. The beacon can include an antennas and hardware platform 180 for housing the transceivers and ranging and ESA antenna control electronics module and supporting the antennas. The ESA antenna can be used for scanning with a narrow beam (for AoA ranging). The ESA antenna can create a 30 dB isotropic (dBi) high bi-directional gain to penetrate a perimeter-of-interest, such as an external wall. The dB isotropic (dBi) is the forward gain of an antenna compared with the hypothetical isotropic antenna, which isotropic antenna (e.g., omni-directional antenna) uniformly distributes energy in all directions.

Figure 6:
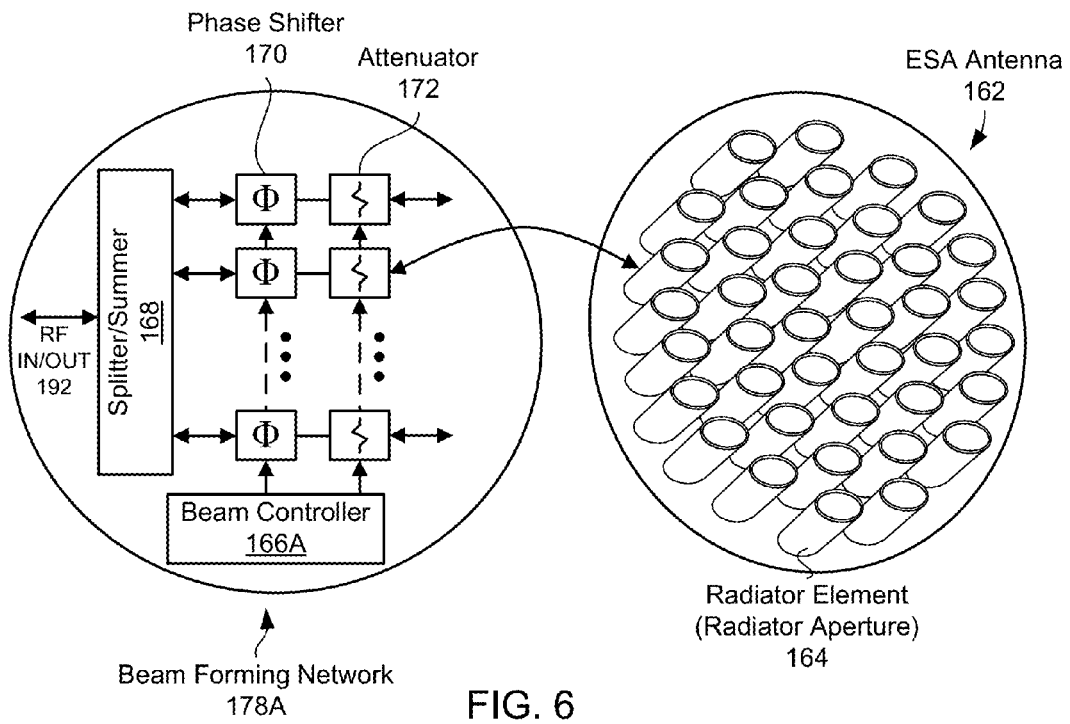
FIG. 6 illustrates a notional depiction of an electronically scanned antenna (ESA) array antenna with attenuator in accordance with an example.

FIG. 6 illustrates radiator elements 164 (e.g., radiator apertures or apertures) of an ESA antenna 162 and a beam forming network 178A on a back side of the radiator elements. The beam forming network can include an RF input/output receiver 192, a splitter and summer module 168, a beam controller 166A, phase shifters 170 for each radiator element, and attenuators 172 for each radiator element. When the ESA antenna emits a signal, the RF input/output module can receive a RF signal or message, which can be formed into a beam. The splitter and summing module can split an output signal from the controller or processor (of control station or beacon) to the phase shifters. Each phase shifters can shift the phase of the signal to form a composite signal with an increase power gain in specified direction. The beam controller can be used to indicate an amount of the phase shift for each of the phase shifters and a magnitude of the signal power for each attenuator. The signal from each attenuator is sent to the radiator elements that emit the signal. The RF attenuators can be used to reduce side-lobes associated with beam forming.

When the ESA antenna 162 receives a signal via the radiator elements 164, the signal is transmitted to the attenuators, which attenuates the signals associated with side-lobes. The attenuators transmit the signals to the attenuated signals to the phase shifters, which phase shifts each received signal to concentrate the received signal into a composite signal with an increase power gain in specified direction. Each phase shifted received signal is transmitted and combined or summed by the splitter and summing module to form the concentrated composite signal, which is transmitted to the RF input/output module. The RF input/output module provide the received concentrated composite signal to the controller or processor (of control station or beacon), which can be processed.

Figure 7:
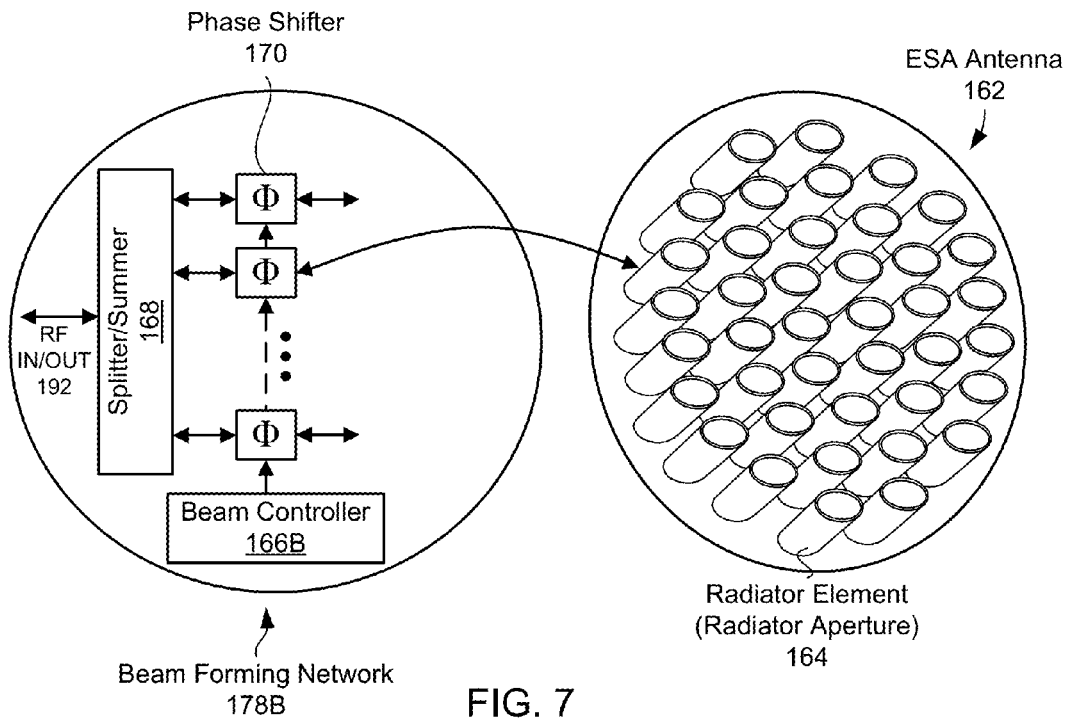
FIG. 7 illustrates a notional depiction of an electronically scanned antenna (ESA) array antenna without attenuator in accordance with an example.

FIG. 7 illustrates a beam forming network 178B without attenuators and a beam controller 166B configured to indicate an amount of the phase shift for each of the phase shifters. The attenuators can be effectively omitted with a software implementation that uses RSSI signal strength to identify the main lobe without significant adverse affects from side lobes and reflection. In particular this implementation with removal of the attenuators lowers the noise figure of the receiver system and increases the system RF power output. The ESA antenna (with the control station) can use a RSSI determination instead of RF attenuators normally used on ESA antennas. Eliminating the attenuators can also reduce the cost of the ESA antenna and simplify the generation of the narrow beam and reception of the response signal. The ESA antenna can generate a pulse signal using phase shifters control with a ZigBee protocol. A RF and direct current (DC) signal flow can be used to control the direction of the pulsed signal, and timing can be used to hold a position for round trip signal path plus a guardband time before proceeding to the next scanning angle (e.g., segment) in the arc. The ESA antenna includes a signal splitters/summers 168, phase shifters 170, and radiator elements 164 and the beam controller. In an example, the ESA antenna can provide ±60 degrees horizontal scanning and up to ±45 degree vertical scanning.

In an example 5×5 array ESA antenna with 5 apertures per array with 25 apertures total measuring approximately 12.3 inches across operating a 2.4 GHz frequency band, the ESA can provide a 3.5 meter (m) range resolution at a 100 m distance. The beamwidth $\Phi$ for each beam can have an angle $\theta$ approximately 20.3 degrees with an antenna gain magnitude of 63 (i.e., 18.0 dBi). In an example 20×20 array ESA antenna with 20 apertures per array with 400 apertures total measuring approximately 49.2 inches across operating a 2.4 GHz frequency band, the ESA can provide a 0.9 m range resolution at a 100 m distance. The beamwidth $\Phi$ for each beam can have an angle $\theta$ approximately 5.1 degrees with an absolute antenna gain of 1006 (i.e., 30.0 dBi). Increasing the number of apertures can increase the resolution, increase the antenna gain, and reduce the beamwidth. The scanning angle for an example ESA antenna can be up to +/−60 degrees sideways and +/−45 degrees vertical with a scanning rate and dwell times adjusted for efficient operation.

The following provides additional details of the examples. The ranging system can provide an information oriented service focused on providing the location and well being of people or objects, where GPS or other location services are typically unreliable or unavailable. The ranging system can use hardware outside of the building (or an area of interest) in a nonintrusive manner using RF technology.

Some applications for the ranging system can include services primarily designed for "first responder" situations, where a portable ranging system configured to operate off an independent power source or commercial grid power can be temporarily and quickly installed around the outside perimeter of a building (or an area of interest). In more permanent situations, the ranging system can provide a secondary system, which can be installed in a proactive manner. In such cases, the ranging system may provide services ahead of anticipated needs or for ongoing situations. In reconnaissance applications, the ranging system can provide the ability to guide a field agent or party to the location of another end user node inside the perimeter of interest. Guiding a party can be performed by knowing the location of both parties and communicating the directions to the party in real time. In surveillance applications using the ranging system, the services may provide current and historical location of an object or person, without any interaction required, inside of a perimeter of interest, which can include a surveillance capability of gathering positioning information about a person without his or her knowledge. The ranging system can be used for safety, security, strategic, and general tracking purposes for the government, military, and companies of all sizes that wish to track personnel, inventory or other equipment.

The ranging system can be portable, self powered, and independent of local infrastructure "tie ins". No internal building or area installment requirements are typically used in the ranging system, except for a small radio transceiver node (e.g., end user node) carried by a client user. In some applications, the ranging system can be permanently installed in, on the roof, in the attic, or crawl space of any building of any size. The ranging system may be installed and operated on or in a vehicle or trailer, boat, plane, or any other moving craft. The ranging system can be designed for rugged commercial, industrial or military environments, including harsh weather conditions, such as rain, wind, temperature, and other harsh conditions. For example, in an emergency situation, such as a building on fire, the ranging system can locate individual firemen inside a burning building. GPS can be unreliable in many if not most commercial buildings, and any existing infrastructure with location services would be incapacitated or undependable during a fire where power can be compromised or heat can destroy existing communication infrastructure systems.

The ranging system can include using narrow RF beams, which scan across and up and down a perimeter of interest, such as a building. The high intensity rays can be capable of penetrating most building construction and foliage obstructions. The beams can carry an interrogation message which is received and responded to automatically by a node carried by a field agent of interest, inside the perimeter. The information of the person or object carrying the end user node, including an end user node location and a status can be communicated back thru a secure dedicated network to a control and command center (e.g., control station), which initiated the inquiry.

In an embodiment, the ranging system can include hardware components, software and systems operations as previously depicted in FIG. 1. The primary components can include an end user node 130, a perimeter beacon 110A-C, and control station 130. The end user node can include a small transponder card or device placed with each person, other device, or object to be tracked. The perimeter beacons can include RF ranging and communication modules outside a theater of operation on a perimeter of an area to monitor. The control station can provide command center operations for node tasking and generating ranging information.

The beacons 110A-C can interconnected with a mesh grid protocol that allows expansion as required to cover the desired perimeter. A mesh grid protocol or a mesh networking topology can be a type of networking where each node not only captures and disseminates its own data, but can also serve as a relay for other nodes. Thus, the each node collaborates to propagate the data in the network. In an example, one beacon can provide complete geo-location of an individual. In other examples, three to upwards of dozens or even hundreds can be used to locate the end user node. Buildings common in industrial park areas may typically need a half to full dozen beacons to adequately cover the perimeter of interest. More beacons may be added or subtracted according the need for total coverage, accuracy and reliability. The thickness and type of walls and other obstruction in the RF beamwidth path of propagation are additional considerations, where there may be value added with increased beacons. The ranging system can then more effectively use a beacon's pulse RF energy inside the perimeter with narrow beams to scan across the area looking for end user nodes within the perimeter.

The nodes can include small transceivers carried by the client users (e.g., field agents, firemen, etc.) or placed on objects to be tracked. The nodes can have active electronics which respond to the RF inquiries. Two types of ranging information can be collected including the directionality angle towards the end user node (e.g., the client user), and/or the range distance to the end user node. Client biometrics may also be monitored. The collected data can be routed to the control station, which can provide the processed information to the operator via a user interface. Data inquiries can originate from the control station. The control station can be near the operational perimeter, or commanded offsite via internet access or other remote monitoring technologies.

The components of the ranging system can communicate via a ZigBee protocol, or more formally known as an Institute of Electrical and Electronic Engineers (IEEE) 802.15.4 standard. The ranging system can include RF transceiver and microcontroller integrated components, programmers, emulators using the 'C' language programming, although other programming languages can be used. As other protocols can support the functionality of the ranging system, the ranging may use protocols and associated hardware, in addition to or instead of the ZigBee protocol.

A RF transceiver using the ZigBee protocol can operate with offset quadrature phase-shift keying (OQPSK) type modulation at 2.4 gigahertz (GHz), which can be acceptable anywhere in the world. Frequencies other than 2.4 GHz can also be considered and implemented to address specific and/or custom needs of clients. The ranging system can implement the ZigBee low duty cycle of network time gated pulses, which can facilitate transmit and receive functions, and also reduce battery use. The ranging system can use sequential spread spectrum modulation which can minimize interference from hostile outside RF sources. Advanced encryption standard (AES) type encryption can be for added security against attempted tampering.

In an example, the ranging system can form a standalone ZigBee local area network (LAN) or wireless LAN (WLAN) with an expandable mesh network. The network can be adapted to the sizing requirements of any size building or area extending to a mile or more (with less stringent specifications).

Information services related to the ranging system can obtain information regarding people in a remote fashion and discrete manner, thru building walls or other obstructions. The services can be obtained by establishing an infrastructure external to the perimeter-of-interest where the person or persons may be located. Radio waves can be used to penetrate inside the perimeter. In the ranging system architecture, nothing physically inside the perimeter related to the system is required to exist except for a small transponder node (e.g., the end user node) placed on the end user.

The ranging system can provide location information of field agents that may be in harm's way. The ranging system can also optionally provide communications services. The informational services are transmitted in a secure fashion, and may also be received discretely in various displays, messages, or audible sounds. For example, the immediate geo-location of any end user node can be available for an operator at a control station. The end user node information can be obtained automatically without interaction (or notice) from the end user carrying the end user node. The accuracy can be within +/−one meter at 100 meter distance from the beacons. In an example, the ranging system can identify which room a person or device is in. In another example, a history of an end user's or item's location can be obtained over a specified period of time (e.g., a 24 hour period of time) inside the ranging area. In another example, the ranging system and the end user node can collect biometric information, such measuring and transmitting a person's heart rate, respiration, or other biometrics, which can be provided to the control station in an automatic fashion, or as commanded with no initiation on the part of the client user. In an example, text messages can be sent and received from a control station to any single end user node in the LAN. The text messages can also be sent to any group preset in the system (e.g., security staff, field agents, or support crew). The control station can be automatically be notified if people enter unauthorized areas or if inventory leaves designated areas. Notification can be sent via text, email, or directly to the control station monitor. The ranging system can use several preset messages (e.g., canned messages), which can be available to respond to common and expected activities and responsibilities inside the perimeter area. For example in a fire situation, a preset message for an end user node might include: "Are you ok?" The present message can provide a quick and easy response in the middle of other important activities. In a more covert type example, the present message can provide a quiet and discrete response to the inquiry. The messages can be sent directly to and from the control station and end users. Messages can be sent in voice packets from or to a user node and the control station. The message can be transmitted via half-duplexing or voice over IP (VoIP). Another voice message can include a message that can be sent, which can be activated after a specified wait time. For security reasons, the message can optionally be set to be listened to only at the discretion and convenience of the operator and end user, which can have an advantage similar to text messaging.

The end user transponder node can be used to obtain information regarding people in a remote fashion and discrete manner, thru building walls or other obstructions. The end user transponder node can include a component used for giving or obtaining information related to any end user persons or objects of interest inside the perimeter. The information can be routed through the ranging system's own secure network to a control station, directed by an operator.

The end user client node can be used as a transceiver and a transponder. The end user client node can include a high level production oriented and inexpensive component. The RF functionalities can include offset QPSK modulation, AES encryption, and sequential spread spectrum. The features of the end user node can be used to support ranging, communications and network functions. The end user node can include a system on chip (SOC or SoC) or a single chip solution, which can have fewer peripheral components supporting the chip. The embedded software can facilitate the functionalities for receiving a narrow radio frequency (RF) beam inquiry message or signal, transmitting a response signal, and processing and generating signals according to other ranging system functions. The node can include additional circuitry, such as external amplifiers (HPA & LNA), which can be used to meet system RF dynamic range requirements. The peripheral amplifier components will enhance the performance for both transmitting and receiving. The end user node can include two antennas which can provide the desired polarization and positional diversity. The two antennas can help secure a lock on the end user node as the user moves around, and the user's body affects the RF antenna radiation.

The end user node can be included in a handset or badge style component with a secure means of attaching the node to the end user. The use and operation of the node may extend only in a specified perimeter or areas of operation. The node may be registered and operational with a specified ranging system. In an example, several hundreds of user nodes may be transmitting signals to beacons and receiving signals from beacons inside a perimeter. The end user nodes can be rugged, light and small, which can be powered by small style batteries and easily charged.

The control station can include a component used for generating and obtaining information related to the end user node of interest inside the perimeter. Information can be routed through the ranging system's own secure network to the control station, directed by an operator.

The control station can include the command and control center. The control station can provide the end point for the mesh grid network routing from the beacons. The beacons can pass ranging and other information to and from the control station to each other and the end user nodes. The control station can be portable and, like the beacons, can be outside the perimeter of operation. FIG. 1 shows a notional signal routing and positioning of the control station relative to other components, the beacons and transponder nodes (e.g., end user nodes). The functions of the control station can include supporting a network around a perimeter of interest, providing location information about field agents inside the perimeter of interest, providing biometrics information about field agents, and providing two-way communication in various modes to field agents.

In an example, the control station can be communicatively couple to the beacons via an external network, such as an internet interface box to the world-wide-web (www). LAN signals used by the on-site control station can be configured with security protocols to operate via the Internet or other external network. Software used for accessing and using the information can be loaded thru a USB port to authorized computers. Authorized operators can have password encryption controlled access via IP to the command ranging systems features. The encryption and other protocols can allow access and operation to a virtual control station at a location of convenience with internet access.

The control station can include a graphical user interface (GUI) designed for convenient operation so an operator can use the ranging system with minimal training. Location and communications interrogations of end users node can be made via the GUI or control station. Group as well as individual messages can be sent to persons with a transponder node.

The GUI can be configured to adapt to and construct various perimeters of interest. The control station and/or GUI can be used to model an area, such as a large manufacturing building for example, in a very short time. The control station and/or GUI can be used to map a building for monitoring, which can be integrated into the location algorithms of the ranging control center system (e.g., ranging system).

The control station can be configured to show the location and movement history of the end users inside the perimeter of interest. The control station can be configured to provide biometrics of the field agents and various modes of secure communication, particularly of a discrete nature, if desired. Software processing can be designed to perform functions such as simultaneous matrix equation solving and triangulation for ranging solutions with information gathered from the respective beacons and user nodes.

Ranging solutions can be used to perform the geo-location of people or objects, such as locating people or objects thru building walls and construction, as well as outdoors in thick vegetation or areas obscuring visibility. The ranging solutions can be provided by a ranging system where a global positioning system (GPS) or other existing infrastructures may be unable or unreliable.

FIG. 2 shows a pictorial representation of beacons 110A-C external to a perimeter used to determine the location of an end user 132. The dual locating capabilities can be used by each beacon. The narrow beam from a platform, such as a beacon, can singly aid in providing angle-of-arrival (AoA) directionality towards a person of interest (e.g., an end user client node). As such, two or more beams may be to find an intersection of beams used to determine an individual's location. However, a second means of ranging can also be obtained from each beacon, using a time-of-arrival (TOF) technique which can generate a distance measurement. Thus, knowing both the angle and the distance can allow each beacon to geo-locate an end user node independently of other beacons. Furthermore, additional beacons focused on an end user node can provide enhanced accuracy and reliability to the system.

The beam width of the beacon can provide an enhanced RF signal strength. As the beam narrows, as compared to an omni-directional beam pattern, the narrow beam's intensity increases two to three orders of magnitude (×1000 or 30 dB). Due to the reciprocity of antenna operation the gain is generated both in the transmission and the reception. The RF signal strength can be sufficient to penetrate inside the perimeter, such as a large industrial grade building or dense foliage outdoors. The dual solution of calculating the AoA and TOF of a narrow beam can provide accurate and reliable ranging information.

In an example, the ranging solution can be based upon the use of ZigBee integrated circuitry, even though positioning or geo-location is not a normal part of the ZigBee protocol. ZigBee was established for data communications and information transfer services. However, the IEEE 802.15.4 configuration can supports radar like features having a pulsed transmit and/or receive switching functionality. The time slot protocol can allow using a similar frequency back and forth (e.g., a downlink and uplink) with a same antenna with minimal filtering. A substantially same protocol can be compatible with the bi-directional requirements of the ESA antenna in the beacons used for AoA ranging. With modifications to the protocol the ranging system can also accommodate a TOF ranging implementation.

A dual ranging capability can be provided for, using two solutions, integrated into the ZigBee circuitry. In an example, the total geo-location solution can provide +/−1 meter degree ranging accuracy at 100 meters distance from the control station.

The range solutions can be relative to each beacon in contact with a targeted user (e.g., end user node). The range solutions can generate magnitude values (related to meters) for the TOF solution, and three dimensional 'vector' values (in degrees) for the AoA solution. The relative range values can be used to derive absolute geo-location positioning via averaging.

Accurate attitude (i.e. positioning and pointing) information of each beacon can be determined and sent with the dual ranging data to the control station for processing and a total geo-location extraction.

In an example TOF solution, ranging can determined directly with propagation timing measurements or tone ranging and phase determination. The associated hardware circuitry can be tied into the beacon transceiver structure. Any impacts to the end user node may be minimal to the hardware, and may be related to software encoding. The TOF solution can typically provide +/1 m distance stand alone positioning accuracy.

In an example AoA solution, directionality can be provided by a narrow radio beam which scans across the perimeter of interest. The beam can be created from an electronically scanned phased array antenna in each beacon. Gimbals may not be used on the ESA antenna gimbals cannot scan fast enough and the gimbals can be too expensive and not rugged enough for portable applications. Scanning can be performed in three dimensional space (i.e. in two planes). In an example, the AOA solution, which can also be stand alone solution can provide +/−1 meter positioning accuracy at 100 meter distance from the beacon.

The beam can be narrowly focused or fan shaped in a latitude/longitude orientation, depending on the practicality and trade-offs of the implementation. Multiple ranging beams simultaneously sweeping from the same beacon antenna can also be used. Simultaneous multiple ranging beams can be generated using multiple beam forming networks on a single antenna platform. The multiple beam forming networks can be used to increase the update positioning rates, and also to accommodate a higher number of end users in a given perimeter area.

In another example TOF solution, the TOF can be used to measure the charging voltage of a circuit which is rising as a function of the time to and from the beacon and end user node. The voltage can then be mathematically mapped to the actual distance to the node.

The operator can send an inquiry regarding the location of an end user node. The inquiry can be routed thru the mesh network, via the beacons. At the instant a beacon sends an inquiry, a voltage pulse can begin charging a capacitor. The voltage can logarithmically charge as a function of the RC time constant.

When the targeted node receives the inquiry, the node can send an acknowledgement back. As soon as the beacon receives the acknowledgement, an analog-to-digital (A/D) circuit can sample the charging voltage. The charged and sampled voltage can be related mathematically to the time-of-flight of the radio wave propagation, and the latency of the relayed circuitry. The control station can have a prior knowledge (i.e., foreknowledge) of the latency and knowledge of the radio wave's speed, which allows the distance between the end user node and the beacon to be determined. The latency can be determined by synchronizing the end user node clock to the bit transitions of the beacon transmitter. Alternatively, the inquiries can be repeated enough times to provide a statistical average of latency determination.

In another example, four or more beacons can each obtain scalar distance information to the user node. The beacons can also be pre-determined as to their location. A mathematical matrix can provide simultaneous equation solving and beacon triangulation to determine the position of the desired node. Alternatively, an angle of arrival solution used in conjunction with the time of flight information can allow a complete positioning solution with a single beacon.

Figure 8:
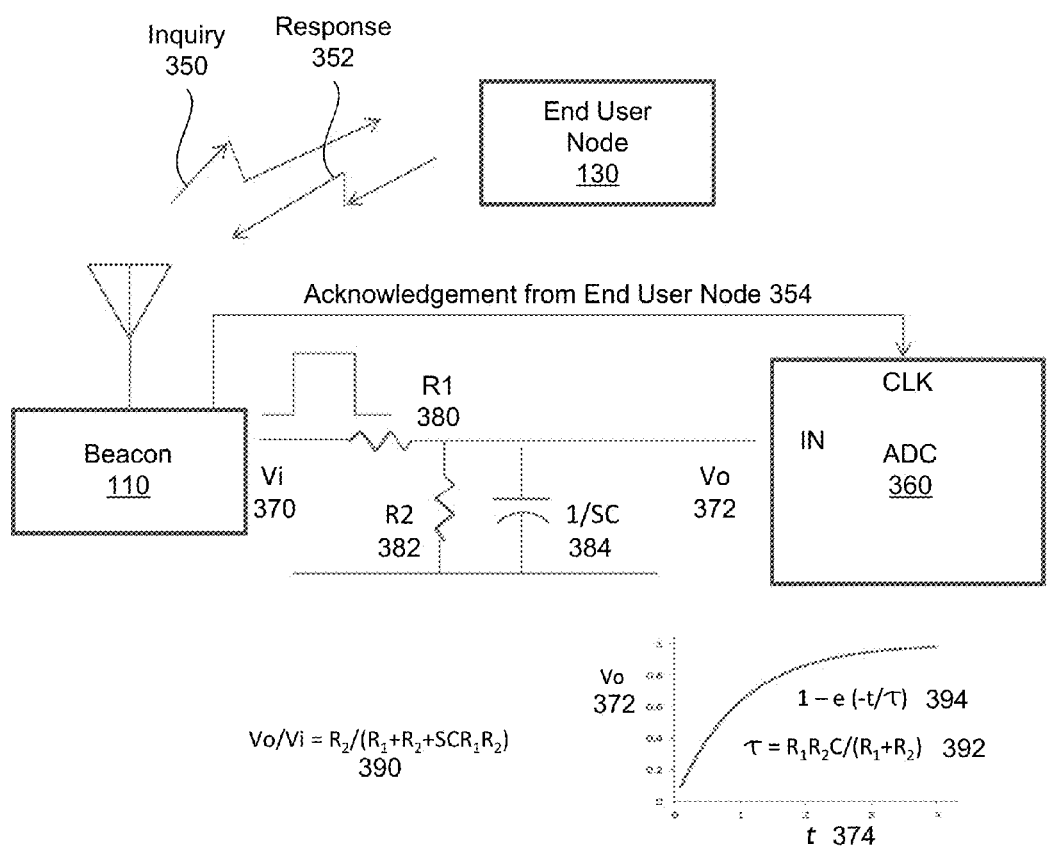
FIG. 8 illustrates a block diagram of determining a time of flight (TOF) using a rising resistive capacitive (RC) voltage in accordance with an example.

FIG. 8 illustrates block diagram and circuitry for determining a time of flight (TOF) using a rising resistive capacitive (RC) voltage. The method and circuit for determining a range (i.e., distance) from a beacon 110 to end user node 130 can be based on an indirect measurement of an RF signal that goes from the beacon to the user node and back to the beacon. A specified resistive capacitive (RC) voltage (e.g., Vo 272) can concurrently charge logarithmically with the TOF of an inquiry 350 signal and a response 352 signal, which can represent a certain amount of displaced time, which can be converted and calculated to distance.

The method directly can measure the rise time of an R/C time constant that is charging during a time a pulse is sent from the beacon to the end user node and returns to the beacon. A beacon can send out an interrogation 360 to user node and simultaneously begins charging a pulse on an input voltage Vi 370 thru a switched capacitor 384 (SC) and resistors 380 and 382. The charging voltage can provide an input to an analog-to-digital (A/D) convertor (ADC) 360. The user node acknowledges 352 the inquiry and returns a signal which creates an incoming pulse back to the beacon. The returned pulse can stop the R/C charging into the ADC. The measured voltage can be mathematically converted into distance. For example, the voltage gain can be represented by $Vo/Vi = R2/(R1+R2+SC*R1*R2)$ 390. Time t 374 can be calculated from $1-e(-t/\tau)$ 394, where $\tau = R1*R2*C/(R1+R2)$ 392. The latency thru the user node can be subtracted, and the net distance can be determined.

The beacon can be a component used for giving or obtaining information via an end user node related to an end user person or object of interest inside the perimeter. The information can be routed through the ranging system's own secure network to a control station, directed by an operator.

The beacon component can include a series of platforms placed around a perimeter of the theater of operation. The platforms can be used to interface with the end user nodes, the control station, and with other beacons.

Figure 5:
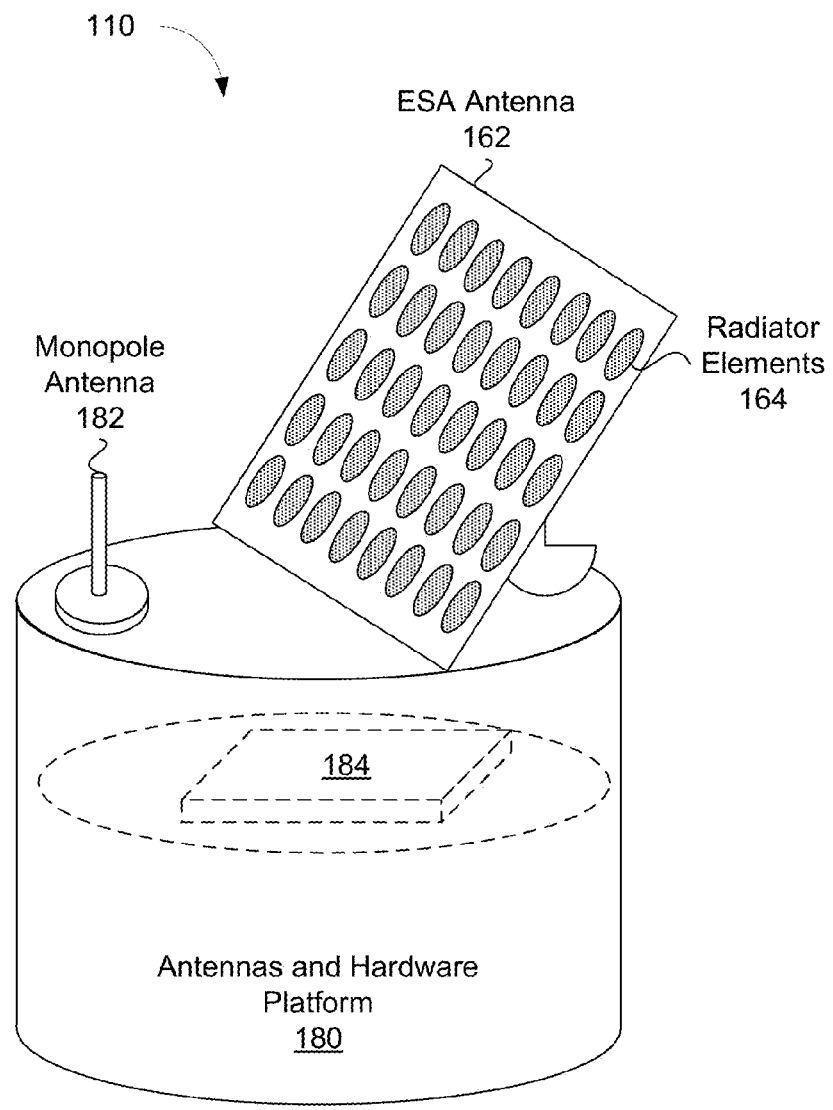
FIG. 5 illustrates a notional depiction of a beacon in accordance with an example.

FIG. 5 illustrates a beacon platform 100 which can include two antennas. The electronically scanned array (ESA) antenna 162 can be pulsing the end user nodes (carried by field agents) with a narrow beam (or beams) inside the theater of operation. The omni-directional antenna 182 can provide the mesh network connectivity between beacons and the control station. The beacon component can act as a hub with simultaneous operations between the end user node and the control station.

As part of the dual ranging capability, the beacon 110 can provide information about beacon's attitude (positioning) and pointing direction. Different sensors, such as a GPS receiver, can be used to gather attitude and/or pointing direction information. The beacon platform can be configured to adjust the beacon's orientation for uneven terrain. The ESA antenna 162 can include an angle of adjustment, so the center of the antenna's scan can be midway up an area (e.g., a building) to be scanned. The attitudes setting for the beacon can include GPS coordinates (e.g., latitude, longitude, or elevation), a horizontal level adjust, an ESA antenna rotational face direction, or an ESA antenna angle adjustment.

The ESA antenna 162 can be supported by a ranging and ESA antenna control electronics module 184 containing a high power amplifier (HPA) and an external low-noise-amplifier (LNA). The HPA can be used to increase the output power to 1 Watt, which is the max power allowed for the antenna by the Federal Communications Commission (FCC). The external low noise amplifier (LNA) can improve the receiver sensitivity. The enhanced dynamic range for both transmit and receive ends can insure the ranging functionality. The signal from the ranging and ESA antenna control electronics module can combine with the high RF gain of the ESA antenna to provide a powerful penetrating RF beam into and out of the theater-of-operation. The RF components to support the communications and mesh net grid functions via the omni-directional antenna may not need the high performance of the dual range circuitry used in the ESA antenna. The omni-directional antenna (e.g., a quarter wave whip or half wave dipole) can provide connectivity between the beacons and the control station.

The array antenna (e.g., electronic scanned array (ESA) antenna) can provide a narrow scanning RF beam which can provide angle-of-arrival positioning information. The array antenna can provide at least one beam, and may provide several beams for enhanced performance capabilities. The ESA can provide a high RF gain which can accompany the narrowness of the beam width, which can be to penetrate thru 'perimeters-of-interest' such as buildings with thick construction, or outdoor areas of heavy foliage.

The ESA antenna can be used to scan across and up and down the perimeter of interest at a rapid rate and can communicate with an end user RF transponder node. The ESA antenna can operate in both a transmit and receive mode. The ESA antenna can be included in the beacon, which can provide a platform for the ESA antenna structure. FIGS. 6-7 show block diagrams of basic components for the ESA antenna. The ESA antenna can include signal splitters/summers 168, phase shifters 170, attenuators 172, and radiator elements 164. Each component can be bi-directional to allow for both transmit and receive. In an example, the ZigBee protocol can be used to provide for pulsed switching time intervals between transmit and receive at closely spaced frequencies. Pulsed switching time interval can reduce filtering and provide compatibility to a single port antenna with dual transmit and receive functionality.

The splitters 168 can divide the signal from the transmitter into the number of signals to feed each antenna aperture. Received signals into the beacon, in the receive mode, from each of the apertures can be summed together by the same circuitry before entering the LNA. For the sake of both paths, the splitter/summer circuitry can be low loss circuit. In an example, the splitter/summer circuitry can include microstrip copper etchings for performance as well as cost considerations.

The attenuators 172 can be used to reduce the side lobes, which in an example can be −13 dBi without the attenuators. However, attenuators can also degrade the noise figure and decrease RF power output. In some applications, side lobes can generate a false lock onto the end user node during the antenna scanning, which can generate inaccurate AoA information. FIG. 7 shows a beam forming network with attenuators omitted. Instead of attenuators, an RSSI indicator capability can be implemented, which can provide a true lock to the antenna's main end-fire lobe.

Figure 9:
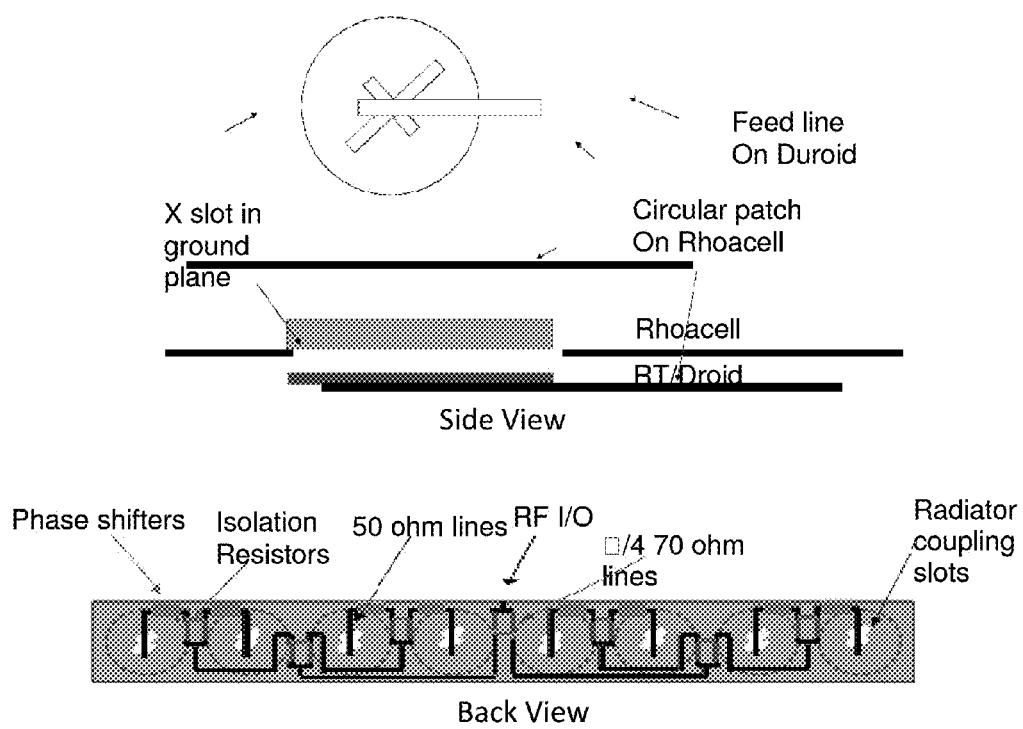
FIG. 9 illustrates a diagram of an electronically scanned antenna (ESA) in accordance with an example.
Figure 10:
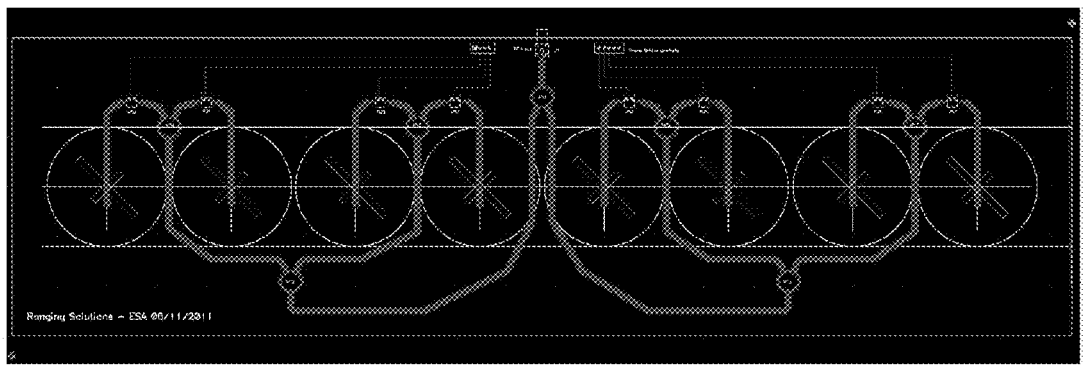
FIG. 10 illustrates a bottom view of an electronically scanned antenna (ESA) laminate layout in accordance with an example.

Voltage controlled phase shifter 170 components can provide the change in direction of the beam, and cause the beam to scan across and up and down the area-of-interest. The beam controller 166A-B signals can be controlled (at least in part) from a micro-processor in the beacon ESA ZigBee module (176 of FIG. 4) (e.g., a ranging Zigbit module). The RF signals can come to or from the antenna radiating elements or radiators. In an example, the apertures can include microstrip etchings onto a PCB. FIGS. 9 and 10 illustrate the come of the components of the beamforming network and the ESA antenna.

The ESA antenna can provide beam polarization. The ranging antenna beam can be implemented using a right hand circular polarization (RHCP) antenna or a left hand circular polarization (LHCP) antenna to handle various position orientation of the end user antenna node. Circular polarization of the antenna can also provide mitigation against multi-path ambiguities. If the signal is reflected, the reflected signal changes to an opposite polarization. For example, a RHCP signal can be reflected as a LHCP which may not be received into the RHCP port of the receiver. Circular polarization adds to the inherent advantage of the narrow beam in reducing multi-path problems.

The ranging system can be installed outside the perimeter of interest using a non-intrusive technology, such as RF technology. The ranging system can be portable, self-powered, and independent of local infrastructure, which can provide current and historical location of an object or person, without any operator or end user node interaction. The high intensity rays can penetrate most building construction and foliage obstructions (e.g., up to 70 dB of penetration or gain). The beams can carry an interrogation message which can be received and responded to automatically by a node, carried by a field agent of interest, inside the perimeter. The information of the end user node's location and status can be communicated back thru a secure dedicated network to a control and command center, which initiated the inquiry.

As illustrated in FIG. 2, the ranging system can provide a dual ranging solution (e.g., AoA and ToF), which can work together to provide reliability. The angle-of-arrival (AoA) solution can give an angular pointing direction towards the end user node (e.g., a field agent) using a narrow beam (e.g., high RF gain) implementation. The time-of-flight (ToF) solution can give the distance information. Either the AoA or ToF solution can provide total positioning by triangulation or intersection of multiple beams from around the perimeter. Both solutions can be used together from a single beacon to provide total positioning (as a stand alone beacon).

In the AoA location solution, the array antenna can provide a narrow beam which electronically scans across the perimeter-of-interest. The signal can be similar to radar, except that the beam may not be reflected. Instead, the signal can be picked up by the end user node, and upon interrogation can return an RF signal to the interrogator (e.g., beacon). The three dimensional angle of the narrow beam can inherently give directionality, where the signal is returned and identified, having a greatest RSSI strength. Two or more narrow beams can produce angle projections that intersect where the end user node is located, thus providing a total geo-location solution. The narrow beam can provide a significant bi-directional RF gain (e.g., up to 20-30 dB) used for the signal to penetrate the building.

In the ToF location solution, each Beacon can measure the time taken to and from an end user node interrogation. The timing information can allow the determination of the distance to the end user. In an example, three beacons with ToF information can triangulate and be simultaneously solved to derive the person's geo-location. A single beacon having both AoA directionality and ToF distance can be used derive an end user node's position. More beacons can serve as confirmation of the information and provide enhanced reliability and accuracy.

The ranging system can use the ZigBee protocol (e.g., IEEE 802.15.4). The RF transceivers can operate with OQPSK type modulation at 2.4 GHz, which is a widely acceptable transmission frequency throughout the world. The ZigBee low duty cycle of pulses can minimize battery use. Sequential spread spectrum can minimize interference from hostile outside RF sources. AES type encryption can provide added security against attempted tampering. The ZigBee local area network can be expandable to any size theater-of-operation. ZigBee is an industry world-wide protocol that can be adapted to the ranging system. The dual ToF and AoA ranging solutions are not standard in the ZigBee protocol. ZigBee was established for data communications and information transfer services. However, the IEEE 802.15.4 configuration can support 'radar like' features having a pulsed transmit/receive switching functionality. The time slot protocol allows using close to a same frequency back and forth with the same antenna with minimal filtering. The time slot protocol can be compatible with the bi-directional functionality of the ESA antenna in the beacons used for AoA ranging. With modification, the ZigBee protocol can accommodate a ToF ranging implementation.

The narrow beam penetration of buildings, obstructions, and other structures can be affected by the building materials and the signal wavelength. For example, the RF signal attenuation of the signal can decrease as the metal screening sizes decrease or as the frequency decreases (i.e., the wavelength of the signal increases). Concrete blocks can have greater attenuation on signals than materials such as wood, plywood, or drywall (e.g., gypsum board). Frequencies above the S band (e.g., 2.4 GHz) can propagate better thru metal screen openings (such as a stucco wall with 'chicken wire' mesh screening, or a chain link fence). Frequencies below the S band (e.g., 2.4 GHz) can propagate better thru solid metal obstructions (such as a metal door). The wavelength of 2.4 GHz (i.e., 12.5 cm wavelength) can be effective for building penetration, and the ESA antenna generating the signal can have small antenna apertures. Although actual values can vary, the RF attenuation thru construction materials, such as plasterboard for a wall can be 3 dB, a glass wall with a metal frame can be 6 dB, a cinder block wall can be 4 dB, an office window can be 3 dB, a metal door can be 6 dB, and a metal door in a brick wall can be 12.4 dB.

The narrow beam RF signal strength loss in penetrating the building can be due to RF shielding due to construction materials used. For example, the outside wall usually has the most metal, and therefore the most RF shielding (e.g., 8 dB). The inner walls usually have a minor effect (e.g., <1 dB of RF shielding per wall). If a cell phone or mobile phone works inside the building, then the ranging system can also communicate with end user nodes inside the building.

Figure 11:
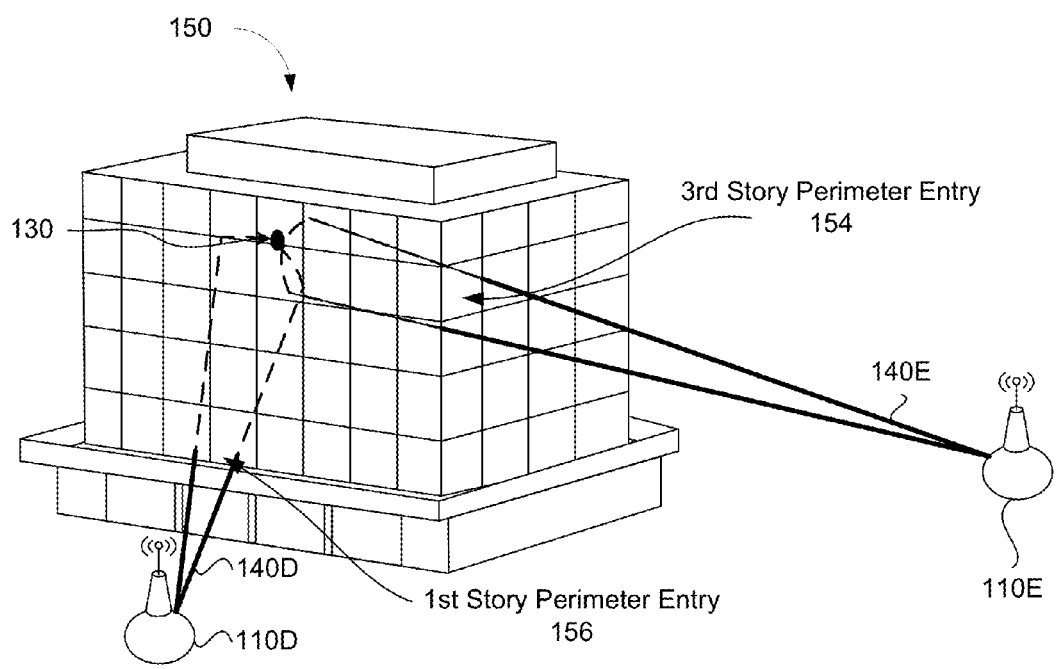
FIG. 11 illustrates a perspective view of building penetration of a ranging system in accordance with an example.

FIG. 11 illustrates a close in beacon 110D and close out beacon 110E placement. Floors between building levels can be constructed of metal reinforced concrete. Floors in multistory buildings 150 can have similar attenuation and RF shielding to outer walls (e.g., 8 dB). In an example with a link budget of 70 dB, the ranging system can penetrate approximately 7-8 levels based on standard (e.g., current) construction materials and practices. When a beacon 110D is close to the building the narrow beam 140D may penetrate more floors (e.g., 1st story perimeter entry 156) to communicate with the end user node 130 with more signal attenuation, but the AoA measurements may be more accurate. When a beacon 110C is further away from the building the narrow beam 140E may penetrate fewer floors (e.g., 3rd story perimeter entry 154) to communicate with the end user node with less signal attenuation, but the AoA measurements may be less accurate. In an example, some beacons can be moved close to the building to provide smaller spreading losses and greater AoA accuracy, while other beacons can be moved further from the building, so that the incident radio beam enters the building at a higher level, which can be a trade off of spreading loss and AoA accuracy. Thus, in some configurations of the system, at least two beacons are located at varying distances from another with respect to the building.

Figure 12:
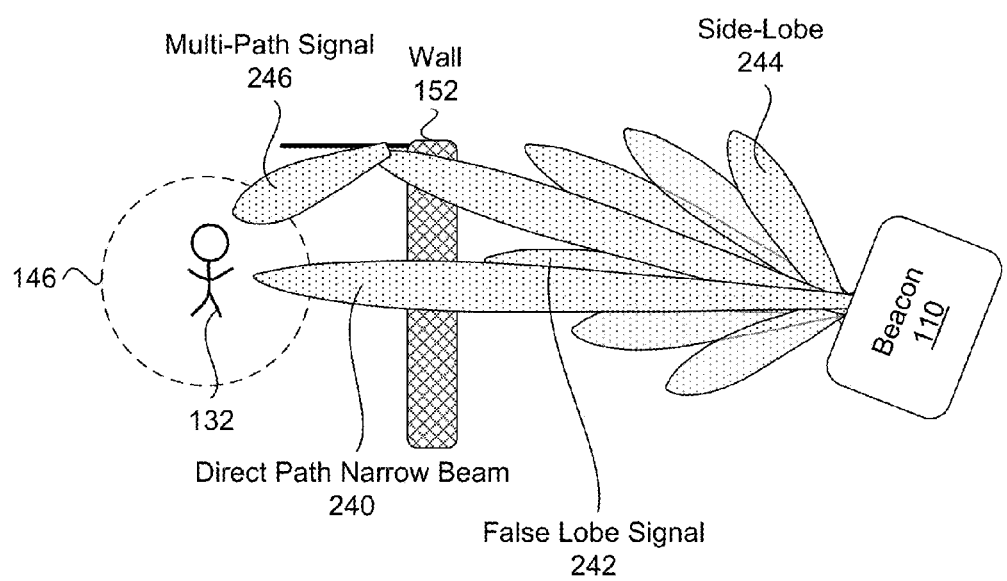
FIG. 12 illustrates a multi-path signal and side-lobe of a beacon of a ranging system in accordance with an example.

FIG. 12 illustrates a multi-path signal 246, side-lobes 244, false lobe signal 242, and direct path narrow beam of a beacon 110 of a ranging system. In the scanning process, the RSSI built in feature of the transceiver Zigbit modules can differentiate between weaker multi-path signals and the stronger one from the main beam. The direct path narrow beam can have the strongest RSSI relative to the multi-path signals, side-lobes, false lobe signals. In an example, the ESA antenna can be right hand circularly polarized (RHCP). Multi-path reflections can become left hand polarized and as such will not be well received by an RHCP antenna.

Figure 13:
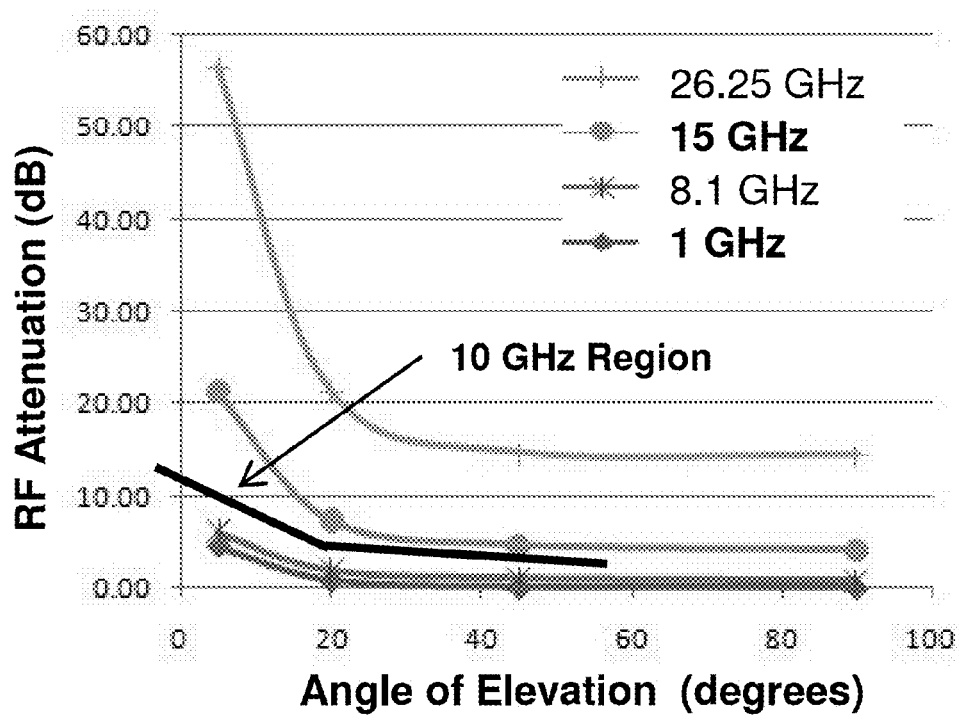
FIG. 13 illustrates a graph of atmospheric radio frequency (RF) attenuation as a function of elevation in accordance with an example.
Figure 14:
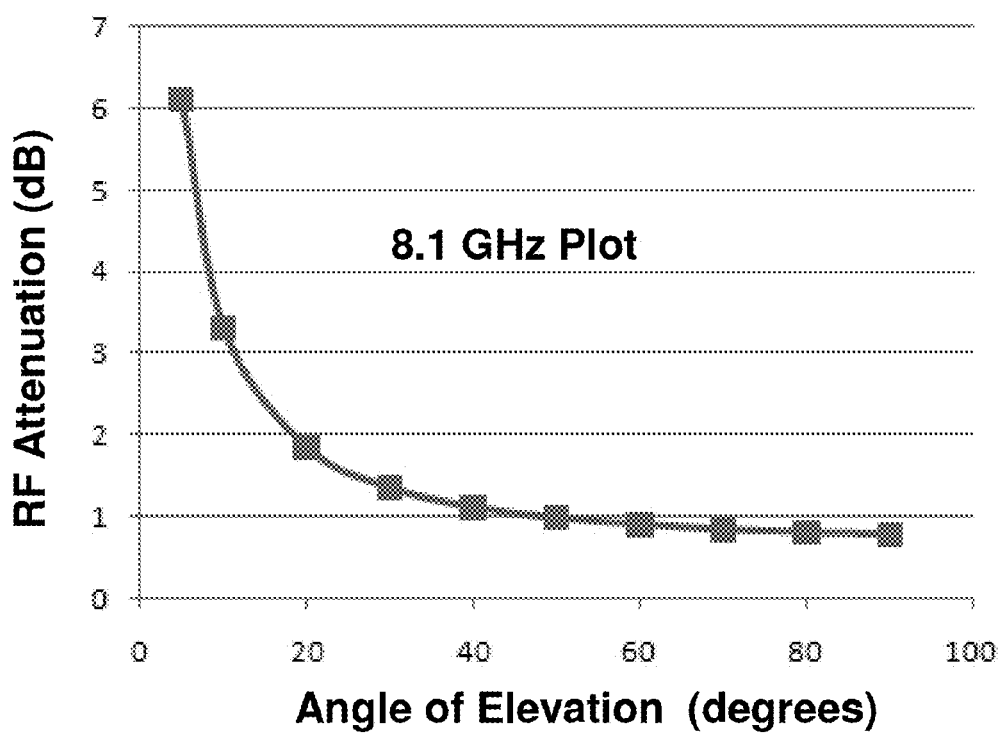
FIG. 14 illustrates a graph of atmospheric radio frequency (RF) attenuation as a function of elevation in accordance with an example.
Figure 15:
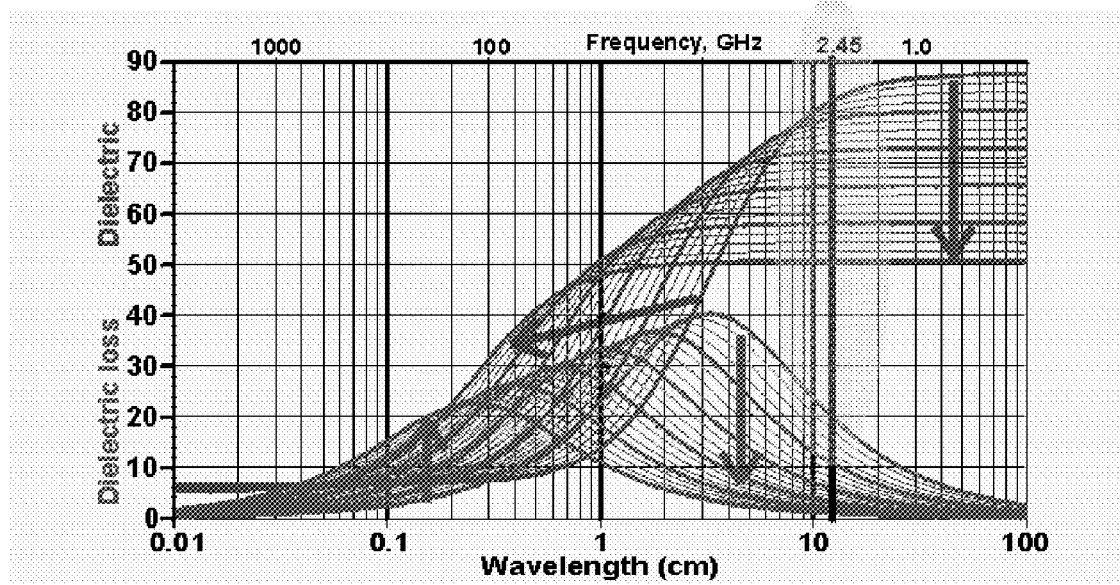
FIG. 15 illustrates a graph of dielectric loss as a function of radio frequency (RF) and temperature in accordance with an example.

The angle of elevation (for large over-the horizon ranges) can have an effect on the RF attenuation. FIGS. 13 and 14 illustrate of a graphs of atmospheric radio frequency (RF) attenuation as a function of elevation at Dulles Va. with 99.9% availability. Dramatic increases in RF attenuation can occur below 20 degrees elevation. Ku and Ka bands can have significant magnitude-of-order attenuation increases below 20 degrees. Ku and Ka bands can have significantly higher RF losses over the lower frequencies. The Ku band is the radio frequency range from 10.95 gigahertz (GHZ) to 14.5 GHz or the band directly below the K-band. The 10 GHz has been recognized as a 'dividing' line for causing significant atmospheric effects on signals. In general these effects will be less than significant especially for the intended lower frequencies of use and shorter ranges of operation (i.e. tens to several hundred meters). Typically, the range of operation will be less than 300 meters and often less than 100 meters, although other ranges can be suitable. The 2.4 GHz frequency band used in an example for the ranging system is minimally affected by water or moisture. FIG. 15 illustrates dielectric loss (e.g., heating effects of moisture) as a function of radio frequency and temperature (0-100 Celsius [C]). Peak dielectric losses (i.e. max absorption and heating capacity) can occur at 10-50 GHz (not 2.4 GHz). Resonances of moisture effects may not occur at 2.4 GHz. RF losses at 2.4 GHz due to moisture can be improved from the higher frequencies where resonance occurs.

Figure 16:
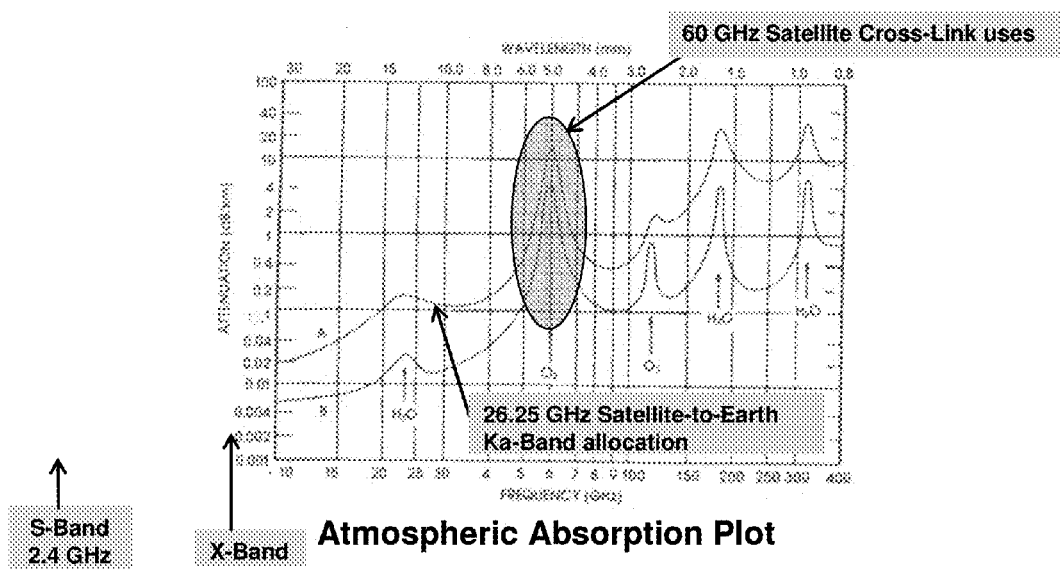
FIG. 16 illustrates a graph of an atmospheric absorption plot in accordance with an example.

Signals can also be affected by gaseous absorption. FIG. 16 illustrates an atmospheric absorption plot. Signals at 22-25 GHz and >40 GHz can have excessive atmospheric attenuation. Water droplets and dioxide can be the main contributing factors for gaseous absorption. Lower frequencies can generally have less atmospheric attenuation. Atmospheric losses due to moisture may not be a factor at 2.4 GHz.

Table 1 illustrates atmospheric radio frequency (RF) attenuation as a function of the angle of elevation at Dulles Va. with 99.9% availability. Lower elevation can cause increased atmospheric RF attenuation impacts.

TABLE 1

| Elevation (deg) | Frequency (GHz) | | | | | | |
|---|---|---|---|---|---|---|---|
| | 1 | 1.4 | 2 | 5 | 8.1 | 15 | 26.25 |
| 5 | 4.59 | 4.88 | 5.18 | 6.29 | 6.1 | 21.29 | 56.62 |
| 20 | 0.83 | 0.89 | 0.96 | 1.24 | 1.85 | 7.43 | 21.39 |
| 45 | 0.11 | 0.13 | 0.15 | 0.28 | 1.04 | 4.79 | 14.39 |
| 90 | 0.07 | 0.09 | 0.1 | 0.19 | 0.79 | 4.26 | 14.4 |
| | Attenuation (dB) | | | | | | |

Moisture effects can be common at S band frequencies. The affects of fog, rain, snow, hail, and/or smog can be minimal due to the wavelength of the IEEE 802.11a and IEEE 802.11g signals (0.17 feet (ft) and 0.41 ft, respectively), which is commonly known to industry groups as WiFi. The wavelength of each type of signal can be appreciably longer than the size of a water droplet or smoke particle, so the signal can pass through moisture types of media with no negative effects or minimal negative effects.

In an example, the end user node can use an IEEE 802.15.4-2003 compliant standard operating at a 2.4 GHz RF frequency, and include AES security encryption; XMTR RF power out at −17 to +20 dBm adjustable; −104 dBm RCVR RF sensitivity; 120 dB optimum with +20 dBm HPA dynamic range; 1.8-3.6 Volt (V) supply voltage (e.g., watch batteries) internally regulated; electrostatic discharge (ESD) robustness; ultra-low current (and power) consumption with 20 nA consumption in sleep mode, 15.5 mA consumption in receive mode (RX), and 16.5 mA (at 3 dBm max RF output) consumption in transmit mode (TX); O-QPSK modulation; 250 kbps data rate; <1 millisecond (ms) power up time; easy interface micro-controllers; and −40 to 85 C temperature range.

In an example using a single dimension 1×8 antenna array (approximately 4×20 inches), the ranging system can operate in quasi-real time at 2.7 seconds per scan with a +/−46 degree of antenna horizontal scanning with 2 degree step sizes (e.g., arc segments).

Figure 17:
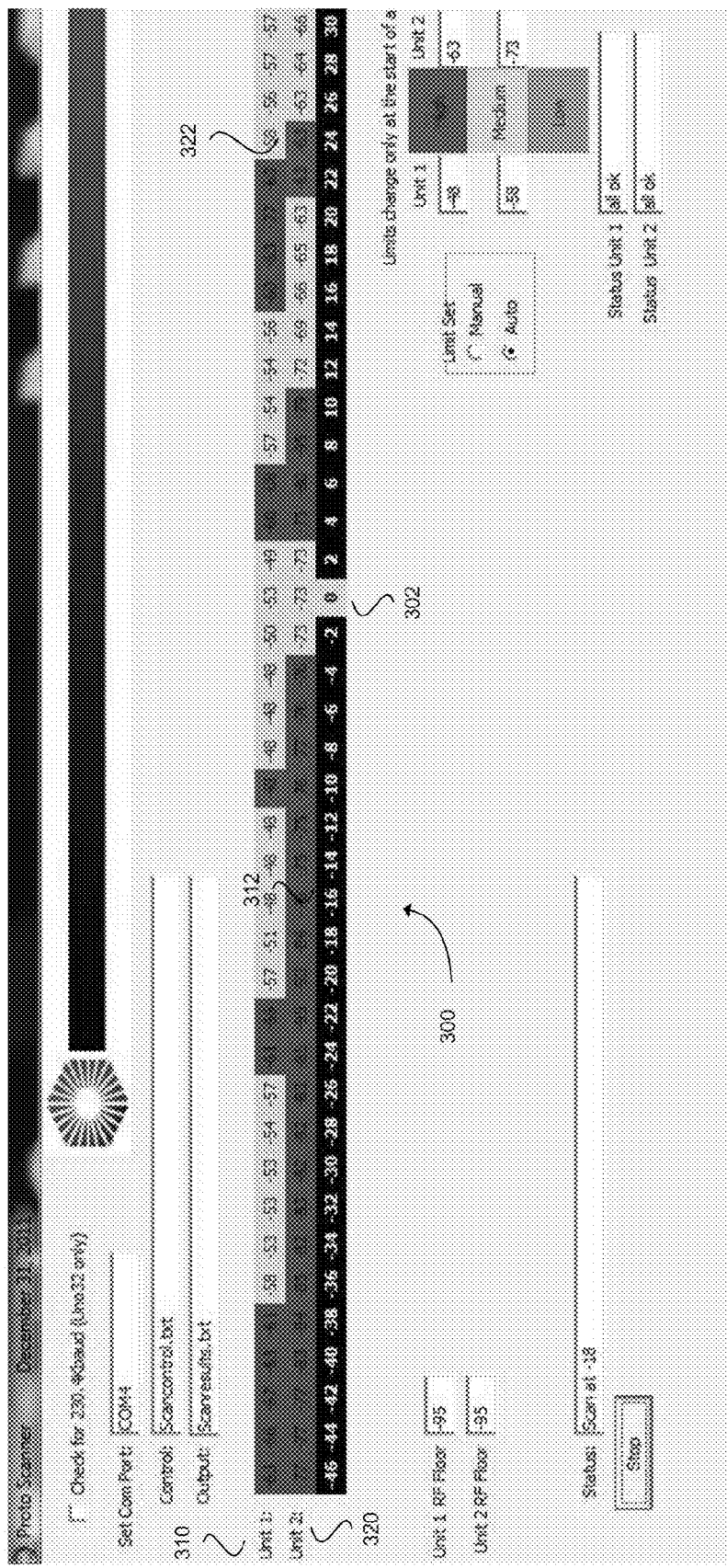
FIG. 17 illustrates a diagram of a graphical user interface (GUI) in accordance with an example.

FIG. 17 illustrates a computer display of a GUI showing the position of two end user nodes 310 and 320 using an AoA and received signal strength indicator (RSSI) based detection. In the example, the ranging system scans 300 from −46 to +46 degrees every 2.7 seconds. The center of the ESA antenna can be zero (0) degrees 302. The color of the display or field can change with the strongest RSS or RSSI information received. For example, the display can automatically update users AoA (e.g., positions) and assign a highlighted color based on the RSS or RSSI information (given in dBm). In FIG. 17, Unit 1 310 has a strongest RSS or RSSI at −10 degrees with a −45 dBm 312 RSS or RSSI, and Unit 1 320 has a strongest RSS or RSSI at 22 and 24 degrees with a −63 dBm 322 RSS or RSSI.

The ranging system (e.g., asset tracking and monitoring system) can track human and other assets in real time and with high accuracy as they move throughout an area (e.g., building). The ranging system can act where GPS cannot to figuratively "see thru walls". Utilizing a control station monitor with a three dimensional (3D) GUI, an exact location of end user node can carefully monitored and logged, providing an unparalleled level of security, information, reliability and safety. Besides positioning data, other information can be transmitted to the command station such as oxygen level, heart rate, blood pressure, oxygen tank levels, and/or temperature. By secure means, the data generated by the ranging system can also be seen by remote monitors.

The ranging system can include at least one of the following advantages, unmatched low visibility and/or indoor performance, quasi-real time asset motion tracking, selective display of assets, ability to monitor and display biometric or telemetry data of asset, uses RF physically non-invasive techniques, cost effective and highly reliable, flexibility to respond to new opportunities, and highly encrypted and secure data transfer.

The ranging system can locate people or objects thru walls by means of radio waves using beacons, end user nodes and the control station. The ranging system architecture can be external to the 'perimeter of interest' and thus can be non-invasive. The self contained architecture of the ranging system may not use an existing infrastructure (such as GPS, hotspots, or routers). The location information can be referenced against the beacons having no a-priori knowledge of the 'perimeter of interest', which can work well in a first responder safety-of-life situation.

The use of narrow beams of radio waves can be used for angle-of-arrival (AoA) directionality. The use of narrow beams can penetrate thick walls or other obstructions. The rise time ToF solution can generate a distance measurement. The use of RF pulses in a frequency shared medium can economize the spectrum reduce direct current (DC) power requirements. The use of spread spectrum can minimize interference to and from other resources. The use of spread spectrum can minimize the potential of the ranging system being electronically jammed. The use of data encryption can protect the information being obtained. The use of transducers, sensors and microcontroller can be used to obtain other information besides location, such as biometrics.

The ranging system and beacons can be configured to adapt the RF pulse power to the reduced power levels needed for determining the end user node location. The adaptive accessory use of transducers, sensors and microcontroller can be used to obtain other information besides location, such as user biometrics and node telemetry. The use of AoA with ToF can provide a total ranging solution with high precision of both direction and depth. The ranging system can be configured to have a total (3 dimensional) location fix with a single beacon. The ranging system can be configured to use multiple beacons to triangulate providing enhanced reliability and accuracy. The ranging system can be configured to electronically scan the radio beams two dimensionally to cover large areas of space in a shorter period of time. The ranging system can be configured to electronically scan the radio beams in a quasi-real time fashion. The use of beacons around the perimeter can provide total coverage. The use of beacons side by side with concurrent probing can provide faster tracking speed and enhanced coverage. The ranging system can adapt the ZigBee protocol to send inquiry RF pulses and receive responses. The use of received signal strength (RSS) can assist the AoA solution to locating the end user node. The ranging system can be configured to project where a user node will be when a user node is moving based on historical information. In an example, the ranging system can dynamically change the range of the scan based on prior end user node location measurements or a predicted end user node location range or area. The ranging system can be configured to expand or contract to adapt to the perimeter-of-interest. The GUI control station of ranging system can be configured to locate and then track the end user nodes. The GUI control station can be configured to provide history of the end user node locations or travel. The ranging system can be configured to provide perimeter modeling at various levels, including a rudimentary and high fidelity level. The ranging system can be configured to use beacons to provide supplementary data such as video and infra-red information. The use of manually pointing to control the ESA antenna focus can be used in addition to automatically scanning In an example, the ESA beacon signals can operate a scanning radar mode with digital signal processing (DSP) to provide sliced picture imaging inside the perimeter (analogous to medical imaging). The scanning radar mode can use RF passive reflection rather than the use of active nodes.

In an example, the ranging system can adapt the 'inquiry and response' handshaking protocol (e.g., ZigBee protocol) to the 'time gating' dwell time windows and scanning for the RF signal. The protocol can be used for the ESA DC pulse antenna scanning controls. The IEEE 802.15.4 configuration can be configured to support 'radar like' features having a pulsed transmit/receive switching functionality. The time slot protocol can allows using close to the same frequency back and forth with the same antenna with minimal filtering. The ranging system can provide multi-path and side-lobe mitigation. In the scanning process, the RSSI built in feature of a transceiver Zigbit module can differentiate between weaker multi-path signals and the stronger one from the main beam. The ESA antenna can be right hand circularly polarized (RHCP) or LHCP. Multi-path reflections can become polarized opposite the transmission and as such will not be well received by an RHCP antenna. A shortest ToF measurement can correlate with direct path signal. Multiple beacons triangulating from different directions will provide a majority vote mechanism to select the end user node location, which can produce enhanced reliability and also accuracy. In the majority vote solution, the location can be generated from the majority of beacons correlated to a position.

In another example, the beacons of the ranging system can provide simultaneous transmission to increase throughput. The beacon controller can be configured to support multiple simultaneous broadcasts. In an example, a beacon antenna interface can support 4 separate connections. The beacon controller computer (e.g., a high end PC) can support multiple universal serial bus (USB) connections and process multiple transactions at an approximately time. In a simultaneous broadcast example, four RF combiners can be used to couple simultaneous signals to the antenna. The combiners can have high reverse loss, so feedback problems may be minimal. Multiple user nodes could be set to different frequencies (e.g., 4 different channels). Each receiver can be tuned to a selected frequency and can ignore the frequencies of other end user nodes. The beacon can also have multiple receivers. Each receiver on the beacon can be tuned to a selected channel of a frequency band (e.g., the ZigBee band). The bandwidth of the beacon antenna can be adequate to support multiple ZigBee channels. For example, the ZigBee band is approximately 2.4 GHz and each ZigBee channel can have a bandwidth of 5 MHz. The antenna percentage bandwidth requirement for 4 simultaneous channels can be a ratio of 4*5 MHz/2.4 GHz.

In another example, the ranging system can provide translated frequency band usage. In an example, the beacon and user transceiver nodes can work at various frequency bands for convenience, which can be translated from ZigBee designated frequencies, or directly derived from the ZigBee designated frequencies. Then, the beacon and user transceiver nodes can use a same ZigBee protocol or modification for ranging.

Figure 18:
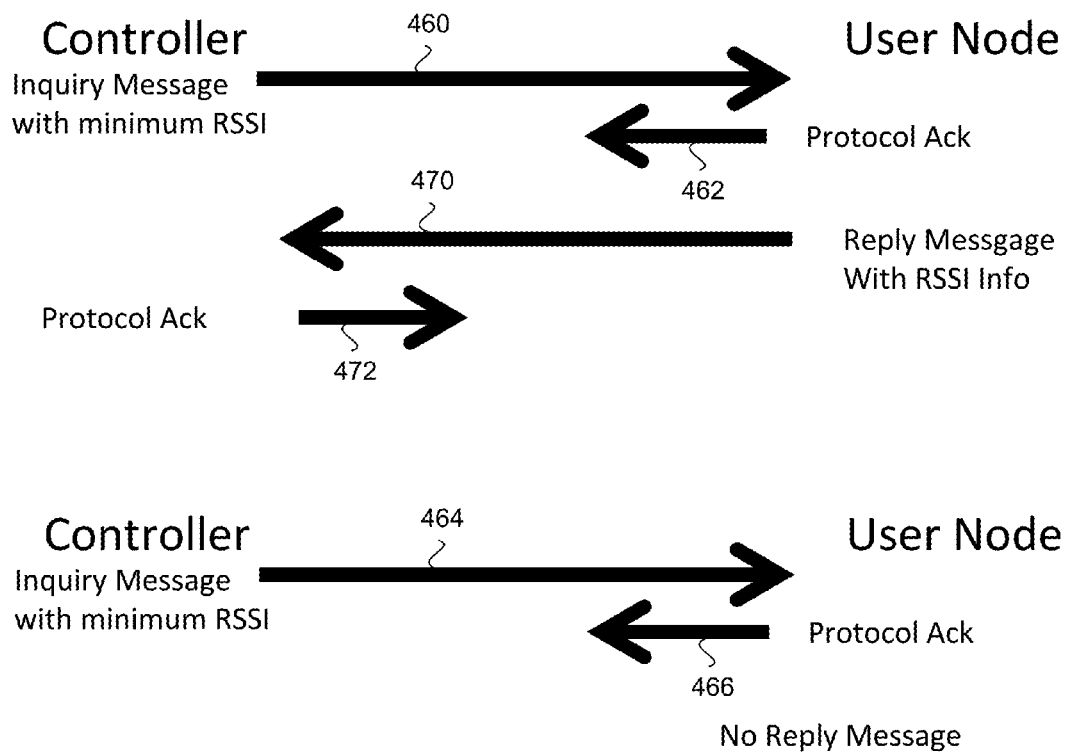
FIG. 18 depicts a diagram for reducing scanning time by reducing a number of messages or by reducing a dwell time in a handshaking protocol via messaging including received signal strength indicator (RSSI) or received signal strength (RSS) information in accordance with an example.

FIG. 18 illustrates a diagram for reducing scanning time by reducing a number of messages or by reducing a dwell time in a handshaking protocol via messaging including received signal strength indicator (RSSI) or received signal strength (RSS) information. The handshaking protocol can be implemented using the ZigBee protocol.

Without a hand shaking modification, a controller (in a control station) can send an inquiry message (e.g., interrogation message) to the user node and the controller can expect a protocol acknowledge (ACK) signal in return. The acknowledge signal (e.g., an inquiry acknowledge signal) can be separate from the reply message (or other message) sent by the user node. If the controller does not receive the inquiry acknowledge signal from the user node, the controller can resend the inquiry message a specified number of times (e.g., up to three times with time out between). If the controller does not receive the inquiry acknowledge signal or the reply message, the controller can proceeds to next a next user node or the controller can wait indefinitely for a reply to be received.

If the user node receives the inquiry message, the user node can read or measure the RSSI of the inquiry message signal from a receiver register and the user node can return the RSSI value (along with other information) to the controller in the reply message. If the user node does not receive the reply acknowledge signal, the user node can resend the reply message a specified number of times (e.g., up to three times). The controller can return the reply acknowledge signal when the controller receives the reply message, and the user node may take no further action until the next inquiry.

In a modified hand shaking protocol example with a RSSI above threshold, a controller can send an inquiry message 460 (e.g., interrogation message) to the user node and the controller can expect a protocol acknowledge (ACK) signal 462 in return. The inquiry message can include a minimum RSSI value. The user node can send a reply message 470 with a measured RSSI of the inquiry message when the measured RSSI of the inquiry message is greater than or equal to the minimum RSSI value.

Under weak signal conditions, the controller can successfully send the inquiry message to the user node, but the user node signal can be too weak for the controller to receive the return message after the acknowledge signal. Without a handshaking modification, the controller may wait indefinitely or for an excessive length of time for a reply message to be received, which can delay a scan. The controller can determine a minimum value of RSSI to which the user node can respond. The minimum RSSI value can be contained in the inquiry message packet. If the user node receiver RSSI value is less than the response minimum in the message, the user node sends an acknowledge signal, but may not send a response message. When the controller receives the acknowledge signal the controller may not resend the inquiry message.

The acknowledge signal 462 (e.g., an inquiry acknowledge signal) can be separate from the reply message 470 (or other message) sent by the user node. If the controller does not receive the inquiry acknowledge signal from the user node, the controller can resend the inquiry message a specified number of times (e.g., up to three times with time out between). If the controller does not receive the inquiry acknowledge signal or the reply message, the controller can proceed to a next segment or a next user node after a specified dwell time or time out interval.

If the user node receives the inquiry message 460, the user node can read or measure the RSSI of the inquiry message signal from a receiver register and the user node can return the RSSI value (along with other information) to the controller in the reply message 470. If the user node does not receive the reply acknowledge signal 472, the user node can resend the reply message a specified number of times (e.g., up to three times). The controller can return the reply acknowledge signal when the controller receives the reply message, and the user node may take no further action until the next inquiry.

In another example with a RSSI below threshold (e.g., an RSSI that is too low), a controller can send an inquiry message 464 (e.g., interrogation message) to the user node and the controller can expect a protocol acknowledge (ACK) signal 466 in return. The inquiry message can include a minimum RSSI value. The user node can send a acknowledge signal but not a reply message when the RSSI of the inquiry message is than the minimum RSSI value. Limiting the transmission of the reply message by the user node when the RSSI value is too low can conserve the power resources of the user node.

Figure 19:
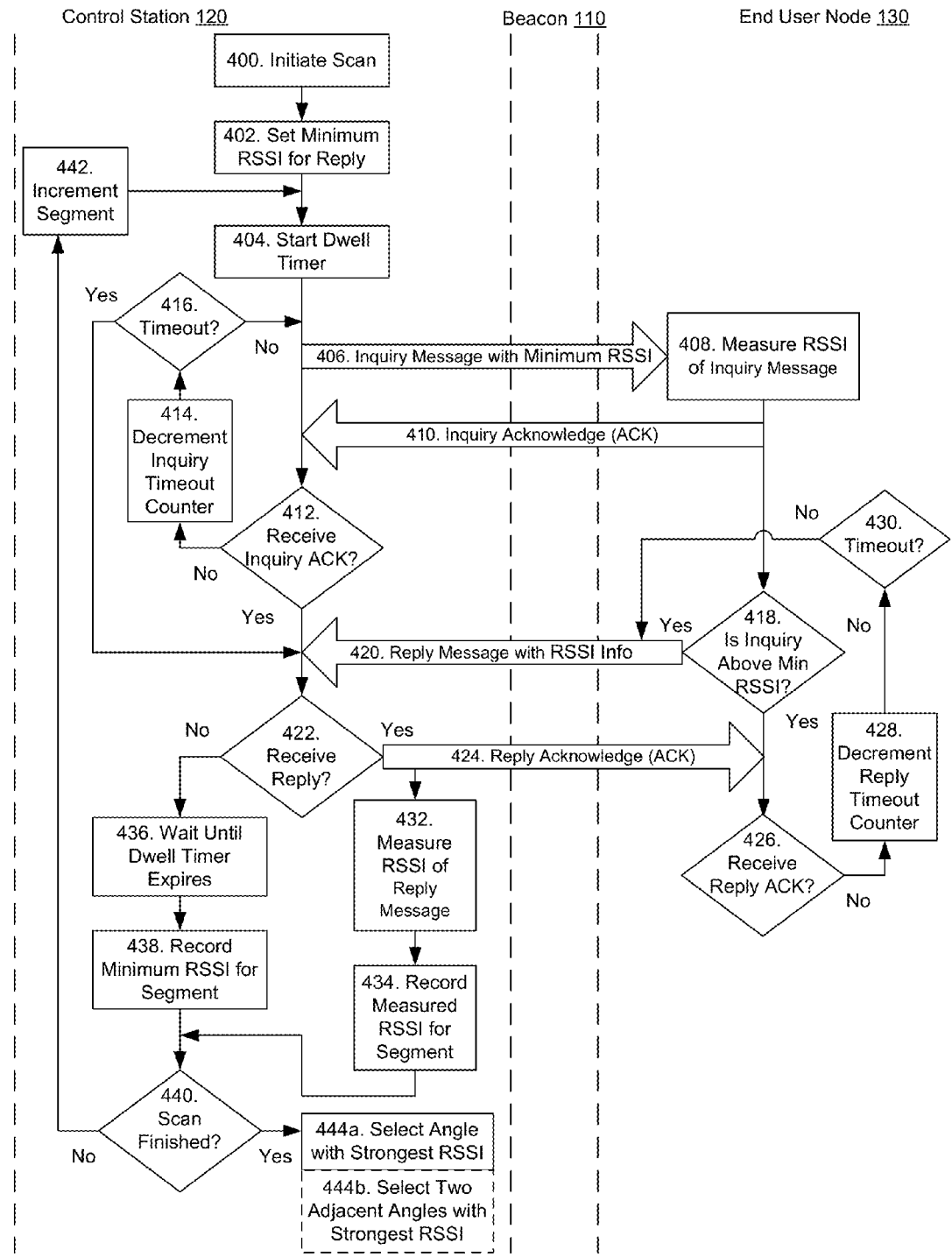
FIG. 19 depicts a flow chart for reducing scanning time by reducing a number of messages or by reducing a dwell time in a handshaking protocol via messaging including received signal strength indicator (RSSI) or received signal strength (RSS) information in accordance with an example.

FIG. 19 illustrates a flow chart for reducing scanning time by reducing a number of messages or by reducing a dwell time in a handshaking protocol via messaging including received signal strength indicator (RSSI) or received signal strength (RSS) information. The handshaking protocol can be implemented using the ZigBee protocol.

A control station 120 or controller in the control station can initiate a scan 400 of an end user node 130 via a beacon 110. The scan can start at a first segment in an arc or a raster pattern. The control station can set a minimum RSSI (or RSS) for the user node to reply 402. In an example, the minimum RSSI can change for each segment or arc of a scan. The control station can also set a dwell timer 404, which can specify a maximum length of time a controller will wait for a reply message 420. In an example, the dwell timer can allow for multiple transmissions of inquiry messages 406, acknowledgements (inquiry acknowledge 410 and reply acknowledge 424 signals), and reply messages 420 plus processing time and a guard band time.

The control station 120 can send an inquiry message with the minimum RSSI 406 to the end user node. The end user node can read the RSSI of the received inquiry message signal from a receiver register or measure the RSSI of the received inquiry message. The end user node can send an inquiry acknowledge signal 410 back to the control station. The end user node can determine if the inquiry message RSSI is above the minimum RSSI 418 for the end user node to reply. If the inquiry message RSSI is not above the minimum RSSI, the end user node can wait for an inquiry message for a next segment interrogation. If the inquiry message RSSI is above the minimum RSSI, the end user node can send a reply message with the RSSI information 420 of the inquiry message.

At the control station 120, the control station can wait for the inquiry acknowledge signal 410 from the end user node 130. The control station can determine if the inquiry acknowledge signal is received 412. If the inquiry acknowledge signal is not received, the control station can decrement an inquiry timeout counter 414, where the inquiry timeout counter counts a specified number of times (e.g., two times) to resend the inquiry message. The control station can determine if the number of resent inquiry messages has been reached (e.g., timeout 416). If the control station has not resent the inquiry message a maximum number of times, the control station resends the inquiry message. If the control station has resent the inquiry message a maximum number of times, the control station can wait for the reply message. If the inquiry-acknowledge signal is received, the control station can wait for the reply message.

At the end user node 130, the end user node can wait for the reply acknowledge signal 424 from the end user node 130 when a reply message is sent. The control station can determine if the reply acknowledge signal is received 426. If the reply acknowledge signal is not received, the user node can decrement an reply timeout counter 428, where the reply timeout counter counts a specified number of times (e.g., two times) to resend the reply message. The end user node can determine if the number of resent reply messages has been reached (e.g., timeout 430). If the end user node has not resent the reply message a maximum number of times, the end user node resends the reply message. If the end user node has resent the reply message a maximum number of times, the end user node can wait for an inquiry message for a next segment interrogation.

The control station 120 can determine if the reply message is received 422 from the end user node. If the reply message is received, the control station can send a reply acknowledge signal 424 to the end use node, and the control station can read the RSSI of the received reply message signal from a receiver register (or measure the RSSI of the received reply message 432). The control station can record a read RSSI for the segment (or record a measured RSSI for the segment 434). The recorded RSSI can include a RSSI from the inquiry message, a RSSI from the reply message, a RSSI from a strongest RSSI of the inquiry message or the reply message, or a function (e.g., an average) of the RSSI of the inquiry message or the reply message. The control station can determine if the scan is finished 440.

If the reply message is not received, the control station 120 can wait for the reply message until the segment dwell timer expires 436. If the reply message is not received before the segment dwell timer expires, the control station can record a minimum RSSI for the segment 438 (or other value or indication that a valid RSSI was not received). The control station can determine if the scan is finished 440. If the scan is not finished, the control station can increment to a next segment 442 and repeat the inquiry message interrogation. If the scan is finished, the control station can select the segment (representing an angle of the end user) with the strongest RSSI 444a. If multiple angles have a strongest RSSI, a midpoint between the multiple angles (e.g., segments) can be used for the angle of the end user node. In another example, the control station can determine a finer resolution of the angle (e.g., AoA) of the end user node, thereby improving accuracy, by using two adjacent segments with a strongest RSSI 444b, as will be described in greater detail below. A scan can be repeated for a next time segment.

Using two adjacent segments with a strongest RSSI can be used generate a finer AoA resolution, thereby improving accuracy. A finer resolution of the RSSI value can assist in the fine resolution of the AoA, thereby improving accuracy. Using two adjacent segments can improve beacon angle of arrival (AoA) estimates compared to the RSSI approach that selects a single angle for the antenna beam pointed at the remote user (e.g., end user node). The method can measure the amplitude from the received remote user signal in two adjacent beacon beams, where RSSI quantization can be used and smaller quantization values can improve accuracy. The ratio of amplitudes from the two beams can results in an improved estimate of the angle of arrival rather than only estimating the beam of arrival. Beams can include every other beam rather than adjacent as long as the two beams used are less than one beamwidth apart.

The following shows the derivation and quantifies the performance of using two beacon beams. AoA estimation can be based on amplitude from two similar (or near identical) beams, where the signal of the signal is similar but in slightly different direction. N1 and N2 can represent thermal noises in beacon beam 1 and beam 2, where beam 1 and beam 2 has a less than or equal to one beamwidth distance orientation from each other. $\Theta$ (e.g., $\Theta$) denotes beacon AoA, and $\Theta 1$ and $\Theta 2$ denote beam pointing of beam 1 and beam 2. The derivation assumes a relatively stationary user, but the derivation can be adapted if the rate of movement is known or can be predicted. The thermal noise N1 and N2 can be assumed to have the same magnitude (i.e., <N1>=<N2>). $S1=S*P1(\Theta)$ and $S2=S*P2(\Theta)$ are the receiver user signal in the two beams, where S1 represent the signal of beam 1, S2 represents the signal of beam 2, S represents the generated signal, P1 represents the power of the signal of beam 1, and P2 represents the power of the signal of beam 2. The signal power can be represented in term of a signal-to-noise ratio (SNR).

$P(\Theta|\Theta 1)=S*Pat(\Theta|\Theta 1)+N1=S*Pat(\Theta|\Theta 1)+S*Pat(\Theta|\Theta 1)/SNR1$ $P(\Theta|\Theta 2)=S*Pat(\Theta|\Theta 2)+N2=S*Pat(\Theta|\Theta 2)+S*Pat(\Theta|\Theta 2)/SNR2$ $R=P(\Theta|\Theta 1)/P(\Theta|\Theta 2)$ can be the measured received power ratio. $DEL=10 \log(P(\Theta|\Theta 1))-10 \log(P(\Theta|\Theta 2))$ is the measured received power ratio in dB. In vector calculus, DEL is a vector differential operator, usually represented by the nabla symbol $\nabla$. When applied to a function defined on a one-dimensional domain, it denotes its standard derivative as defined in calculus. When applied to a field (a function defined on a multi-dimensional domain), DEL may denote the gradient (locally steepest slope) of a scalar field, the divergence of a vector field, or the curl (rotation) of a vector field, depending on the way it is applied.

The noise and reference SNR can be set by the beam pointed at user (i.e., link budget). $P(0)=10 \log(S+N)=10 \log(S(1+N/S))=10 \log(S)+10 \log(1+1/SNR)$ for a beam pointed directly at the user.

$10 \log(1+x)=4.3 \ln(1+x) \sim 4.3x$ $P(0) \sim 10 \log(S)+4.3/SNR$; SNR is analog, not dB and valid for large SNR (>10 dB). Similar beams (or near identical beams) are assumed in the following for ease in derivation. Non-identical beacon beams may use a lookup table for each beam or a more complex description depending on the AoA accuracy desired.

The derivation can be similar for near identical beams (e.g., the principle can be the same as near identical beams). In dB space, beam loss, $L1=3(\Theta-\Theta 1)^2/(BW/2)^2$ dB can use the Gaussian beam approximation, where BW is beamwidth. A more complex beam description may be employed to improve accuracy when needed. Beams can be near identical except for a pointing direction (e.g., $\Theta 1$ and $\Theta 2$) for ease in derivation. 1/SNR1 and 1/SNR2 can be independent random variables from Gaussian process, where SNR1 is a SNR for beam 1 and SNR2 is a SNR for beam 2, and N/S represent the noise over the signal.

$1/SNR1=N/S$ and $<1/SNR1>=<1/SNR2>$ $DEL(\Theta|\Theta 1, \Theta 2)=P(\Theta-\Theta 1|\Theta 1)-P(\Theta-\Theta 2|\Theta 2)$ is the measured user signal in dB from parabolic approximation.

$DEL(\Theta|\Theta 1, \Theta 2)=3*(\Theta-\Theta 1)^2/(BW/2)^2-3*(\Theta-\Theta 2)^2/(BW/2)^2+4.3/SNR1-4.3/SNR2$ $DEL(\Theta|\Theta 1, \Theta 2)=(-6*\Theta 1*\Theta+3*\Theta 1^2+6*\Theta*\Theta 2-3*\Theta 2^2)/(BW/2)^2+4.3/SNR1-4.3/SNR2$ The AoA estimate can be represented by $\Theta$.

$\Theta=[(DEL-4.3/SNR1+4.3/SNR2)(BW/2)^2+3*\Theta 2^2-3*\Theta 1^2]/(6*\Theta 2-6*\Theta 1)$ $\Theta=[(DEL-4.3/SNR1+4.3/SNR2)(BW/2)^2]/(6*\Delta\Theta 12)+3*(\Theta 2+\Theta 1)/6$ where $\Delta\Theta 12=\Theta 2-\Theta 1$, the difference in beam pointing angles.

The expected AoA estimate can eliminate some terms, such as <1/SNR>=<N/S>=<N>/S and <-4.3/SNR1+4.3/SNR2>=0

The resulting AoA can be an unbiased estimate.

Expected AoA estimate can be represented by $<\underline{\Theta}>=[DEL(BW/2)^2]/(6\Delta\Theta 12)+(\Theta 2+\Theta 1)/2$ $<\underline{\Theta}^2-<\underline{\Theta}>^2>=$Var of $\Theta$ which can be proportional to 4th moment of Gaussian field$=3\sigma^4 \rightarrow 3N^2$.

$<\underline{\Theta}^2-<\underline{\Theta}>^2>=[2*4.3*(BW/2)^2/(6\Delta\Theta 12)/S]^2*3N^2$ The AoA estimate standard deviation can be represented by $\sigma\Theta=sqt(3)*8.6*(BW/2)^2/(6\Delta\Theta 12)]/SNR$.

$\sigma\Theta=0.62*BW^2/(SNR\Delta\Theta 12)$, where SNR is analog.

Figure 20:
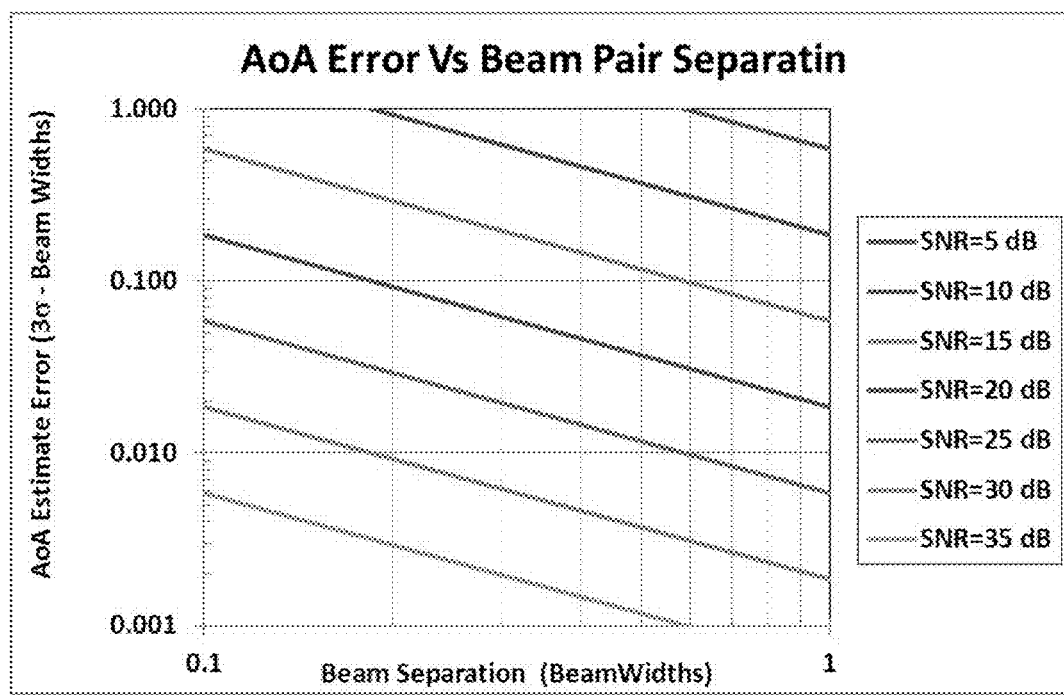
FIG. 20 illustrates a graph of AoA error relative to beam pair separation in accordance with an example.
Figure 21:
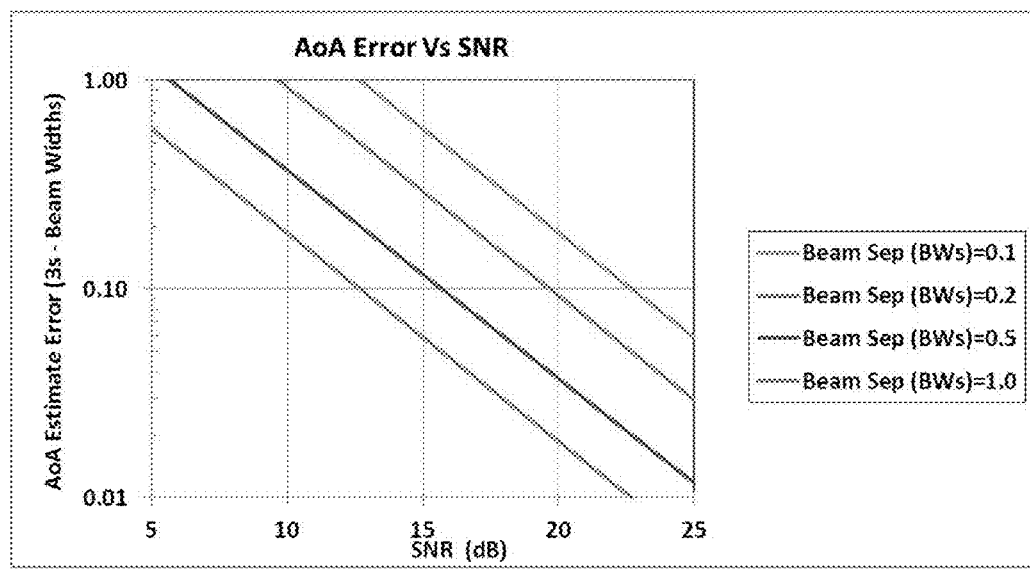
FIG. 21 illustrates a graph of AoA error relative to beam pair separation in accordance with an example.

The AoA error can be represented by $\sigma\Theta/BW=0.62/(SNR*\Delta\Theta 12/BW)$ where SNR is analog and $\sigma\Theta$ is the standard deviation of the AoA. AoA error is given in terms of beacon beamwidth. FIGS. 20 and 21 illustrate graphs of AoA error relative to beam pair separation, where the error is limited to <1 beam width separation due to side-lobe ambiguities.

Figure 22:
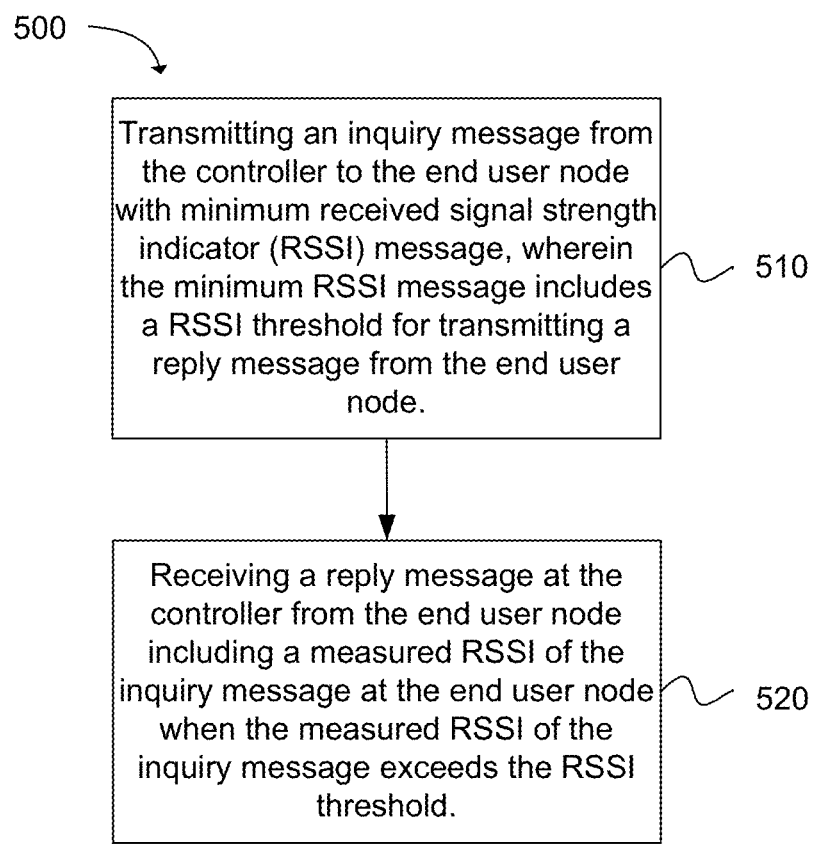
FIG. 22 depicts a flow chart of a method for communicating between an end user node and a control station controller used in determining a location of the end user node relative to a beacon in accordance with an example.

Another example provides a method 500 for communicating between an end user node and a control station controller used in determining a location of the end user node relative to a beacon, as shown in the flow chart in FIG. 22. The method includes the operation of transmitting an inquiry message from the controller to the end user node with minimum received signal strength indicator (RSSI) message, wherein the minimum RSSI message includes a RSSI threshold for transmitting a reply message from the end user node, as in block 510. The operation of receiving a reply message at the controller from the end user node including a measured RSSI of the inquiry message at the end user node when the measured RSSI of the inquiry message exceeds the RSSI threshold follows, as in block 520.

Figure 23:
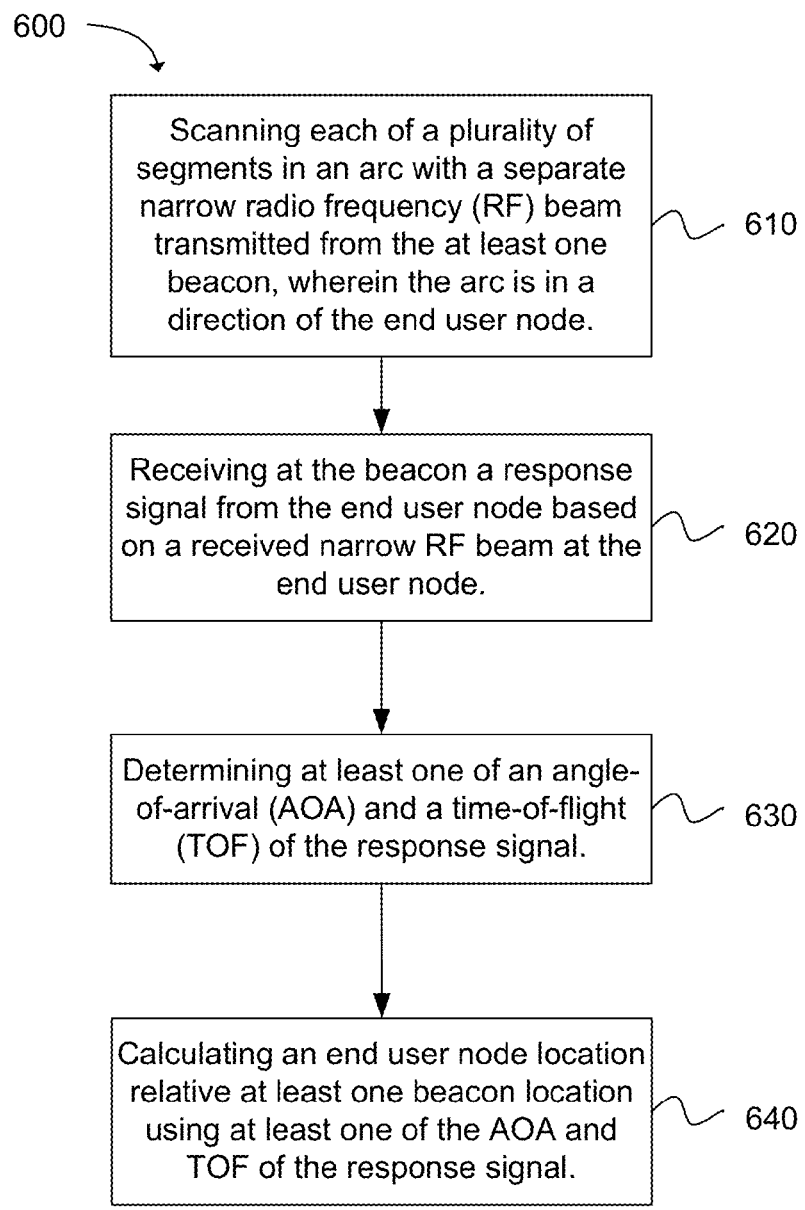
FIG. 23 depicts a flow chart of a method for determining a location of an end user node relative to the at least one beacon in accordance with an example.

Another example provides a method 600 for determining a location of an end user node relative to the at least one beacon, as shown in the flow chart in FIG. 23. The method includes the operation of scanning each of a plurality of segments in an arc with a separate narrow radio frequency (RF) beam transmitted from the at least one beacon, wherein the arc is in a direction of the end user node, as in block 610. The operation of receiving at the beacon a response signal from the end user node based on a received narrow RF beam at the end user node follows, as in block 620. The next operation of the method can be determining at least one of an angle-of-arrival (AOA) and a time-of-flight (TOF) of the response signal, as in block 630. The method can further include calculating an end user node location relative at least one beacon location using at least one of the AOA and TOF of the response signal, as in block 640.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A beacon for a ranging system to determine a location of at least one end user node within a perimeter of interest, comprising:
   an electronic scanned array (ESA) antenna configured to emit a separate radio frequency (RF) phased-array narrow beam for each of a plurality of segments of an arc for a dwell time, and configured to receive from the end user node a response signal based on at least one of the RF phased-array narrow beam, wherein the plurality of segments of the arc collectively span the perimeter of interest which is scanned stepwise at a specified time interval; and
   a transceiver configured to transmit a pulsed signal via the RF phased-array narrow beam, and receive the response signal.

2. The beacon of claim 1, further comprising:
   a processing module configured to calculate at least one of an angle-of-arrival (AOA) and a time-of-flight (TOF) from the response signal and generate a location of the end user node within the perimeter of interest relative to a location of the beacon.

3. The beacon of claim 2, wherein the processing module is further configured to determine an absolute location of the end user node by information selected from the group consisting of GPS coordinates, horizontal level adjustments, rotational face direction of the ESA antenna, angle adjustment of the ESA antenna, and combinations thereof.

4. The beacon of claim 2, wherein the processing module is further configured to measure a received signal strength indicator (RSSI) from the received response signal.

5. The beacon of claim 1, further comprising:
   a node networking antenna configured to communicate with other beacons and a control module via a local area network (LAN).

6. The beacon of claim 1, further comprising
   a node networking antenna configured to communicate with at least one end user node upon interrogation, wherein the at least one end user node provides at least one of navigation information, biometric information, an acknowledgement signal, and end user node status information via the node networking antenna.

7. The beacon of claim 1, The beacon of claim 1, wherein the ESA antenna includes components selected from the group consisting of a beam controller, a plurality of radiator apertures, a phase shifter, a splitter or a summer, and combinations thereof.

8. The beacon of claim 7, wherein the ESA antenna includes a plurality of radiator apertures configured in at least an array of a row or a column.

9. The beacon of claim 1, wherein the ESA antenna includes a right hand circularly polarized (RHCP) antenna or a left hand circularly polarized (LHCP) for reducing multipath reflections.

10. The beacon of claim 1, wherein the beacon uses a modified ZigBee protocol for signal transmissions, wherein the modified ZigBee protocol reduces scanning time by reducing a number of messages or by reducing the dwell time in a handshaking protocol via messaging including received signal strength indicator (RSSI) information.

11. The beacon of claim 1, wherein the plurality of segments of the arc are from 0.2° to 20° each.

* * * * *

UNITED STATES PATENT AND TRADEMARK OFFICE
CERTIFICATE OF CORRECTION

PATENT NO. : 8,868,133 B1  
APPLICATION NO. : 13/489298  
DATED : October 21, 2014  
INVENTOR(S) : Glen Var Rosenbaum Page 1 of 1

It is certified that error appears in the above-identified patent and that said Letters Patent is hereby corrected as shown below:

Title Page, Item 73, Assignee section, "Corvas Technologies Corp." should be --Corvus Technologies Corp.--

Title Page, Column 2, References Cited section, Other Publications, "U.S. Appl. No. 13/492,587, filed Jun. 8, 2012; John C. Lundgreen" should be --U.S. Appl. No. 13/492,587, filed Jun. 8, 2012; Glen Var Rosenbaum--

Signed and Sealed this  
Twenty-third Day of June, 2015

Michelle K. Lee  
*Director of the United States Patent and Trademark Office*